United States Patent
Jeon et al.

(10) Patent No.: US 10,951,360 B2
(45) Date of Patent: Mar. 16, 2021

(54) DYNAMIC HARQ CONFIGURATION AND BITMAP BASED ACK/NACK

(71) Applicant: Apple Inc., Cupertino, CA (US)

(72) Inventors: Jeongho Jeon, San Jose, CA (US); Abhijeet Bhorkar, Fremont, CA (US); Qiaoyang Ye, Fremont, CA (US); Fatemeh Hamidi-Sepehr, Santa Clara, CA (US); Hwan-Joon Kwon, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 111 days.

(21) Appl. No.: 15/766,466

(22) PCT Filed: Dec. 9, 2016

(86) PCT No.: PCT/US2016/065897
§ 371 (c)(1),
(2) Date: Apr. 6, 2018

(87) PCT Pub. No.: WO2017/123356
PCT Pub. Date: Jul. 20, 2017

(65) Prior Publication Data
US 2018/0294924 A1    Oct. 11, 2018

Related U.S. Application Data

(60) Provisional application No. 62/277,809, filed on Jan. 12, 2016.

(51) Int. Cl.
*H04L 1/18* (2006.01)
*H04L 1/16* (2006.01)
(Continued)

(52) U.S. Cl.
CPC .......... *H04L 1/1812* (2013.01); *H04L 1/1614* (2013.01); *H04L 1/1822* (2013.01);
(Continued)

(58) Field of Classification Search
None
See application file for complete search history.

(56) References Cited

U.S. PATENT DOCUMENTS 10,075,956 B2 * 9/2018 Berggren .......... H04W 72/0453
10,091,788 B2 * 10/2018 Damnjanovic ... H04W 72/0453
(Continued)

OTHER PUBLICATIONS

Nvidia, "UL HARQ considerations for LTE LAA", R2-151551, 3GPP TSG-RAN WG2 #89bis, Bratislava, Slovakia, Agenda Item 7.1.3, Apr. 20-24, 2015, 5 pages.
(Continued)

*Primary Examiner* — Ayaz R Sheikh
*Assistant Examiner* — Faiyazkhan Ghafoerkhan
(74) *Attorney, Agent, or Firm* — Stoel Rives LLP

(57) ABSTRACT

The present disclosure provides for a user equipment (UE) operating in an unlicensed spectrum in time division duplex (TDD). Operating a UE in an unlicensed spectrum in TDD can comprise generating a bitmap message. Generating a bitmap message can include accessing a bitmap comprising a plurality of positions based on a plurality of supported HARQ processes including the HARQ process, mapping a HARQ process identifier (ID) of the HARQ process to a position from the plurality of positions of the partitioned bitmap, and generating a bitmap message comprising the ACK/NACK message in the position of the bitmap corresponding to the HARQ process ID.

14 Claims, 12 Drawing Sheets

(51) Int. Cl.
*H04L 5/14* (2006.01)
*H04W 16/14* (2009.01)
*H04W 84/04* (2009.01)

(52) U.S. Cl.
CPC .............. *H04L 5/14* (2013.01); *H04W 16/14* (2013.01); *H04W 84/042* (2013.01)

(56) References Cited

U.S. PATENT DOCUMENTS

| | | | | |
|---|---|---|---|---|
| 10,237,863 | B2* | 3/2019 | Ye | H04L 1/1861 |
| 10,257,856 | B2* | 4/2019 | Park | H04W 74/00 |
| 10,375,729 | B2* | 8/2019 | Park | H04W 74/0808 |
| 10,454,631 | B2* | 10/2019 | Han | H04L 1/1812 |
| 10,536,936 | B2* | 1/2020 | Park | H04W 72/042 |
| 2015/0365931 | A1* | 12/2015 | Ng | H04L 1/1893 370/329 |
| 2016/0135143 | A1* | 5/2016 | Won | H04W 12/08 370/312 |
| 2016/0182204 | A1* | 6/2016 | Hsieh | H04L 1/1893 370/329 |
| 2016/0278048 | A1* | 9/2016 | Nory | H04W 74/006 |
| 2016/0278049 | A1* | 9/2016 | Nory | H04L 27/0006 |
| 2016/0278050 | A1* | 9/2016 | Nory | H04L 5/0053 |
| 2017/0005768 | A1* | 1/2017 | Yin | H04W 74/02 |
| 2017/0055296 | A1* | 2/2017 | Cheng | H04L 5/0055 |
| 2017/0163388 | A1* | 6/2017 | Wiemann | H04W 72/0413 |
| 2017/0367079 | A1* | 12/2017 | Nory | H04L 1/1812 |
| 2018/0020435 | A1* | 1/2018 | Nory | H04L 5/0044 |
| 2018/0048498 | A1* | 2/2018 | Stern-Berkowitz | H04W 16/14 |
| 2018/0063871 | A1* | 3/2018 | Cheng | H04L 1/1893 |
| 2018/0115981 | A1* | 4/2018 | Kim | H04W 24/10 |
| 2018/0175975 | A1* | 6/2018 | Um | H04L 1/1816 |
| 2018/0249484 | A1* | 8/2018 | Kim | H04W 74/0808 |
| 2020/0213974 | A1* | 7/2020 | Won | H04W 4/06 |
| 2020/0235965 | A1* | 7/2020 | Stern-Berkowitz | H04L 27/0006 |
| 2020/0296750 | A1* | 9/2020 | Kim | H04W 72/1278 |
| 2020/0344803 | A1* | 10/2020 | Noh | H04L 27/26 |

OTHER PUBLICATIONS

PCT/US2016/065897, International Search Report and Written Opinion, dated Jun. 23, 2017, 21 pages.

ZTE, "Overview on LAA UL", R1-152970, 3GPP TSG RAN WG1 Meeting #81, Fukuoka, Japan, Agenda Item 6.2.4.3, May 25-29, 2015, 6 pages.

ZTE, "Details of Design on DL frame structure and signaling for LAA", R1-156988, 3GPP TSG RAN WG1 Meeting #83, Anaheim, California, USA, Agenda Item 6.2.3.3, Nov. 15-22, 2015, 11 pages.

* cited by examiner

DYNAMIC HARQ CONFIGURATION AND BITMAP BASED ACK/NACK

RELATED APPLICATIONS

This application is a national stage filing under U.S.C § 371 of International Patent Application No. PCT/US2016/065897, filed Dec. 9, 2016, which claims the benefit of priority to U.S. Provisional Patent Application Nos. 62/277,809, filed Jan. 12, 2016, both of which are hereby incorporated by reference herein in their entirety.

TECHNICAL FIELD

The present disclosure relates to dynamic hybrid automatic repeat request (HARQ) process configuration and bitmap-based acknowledgement (ACK)/negative acknowledgement (NACK) transmissions. In particular, the present disclosure relates to HARQ process configuration and bitmap-based transmissions for ACK/NACK in an unlicensed spectrum in time division duplex (TDD).

DETAILED DESCRIPTION OF PREFERRED EMBODIMENTS

Figure 1:
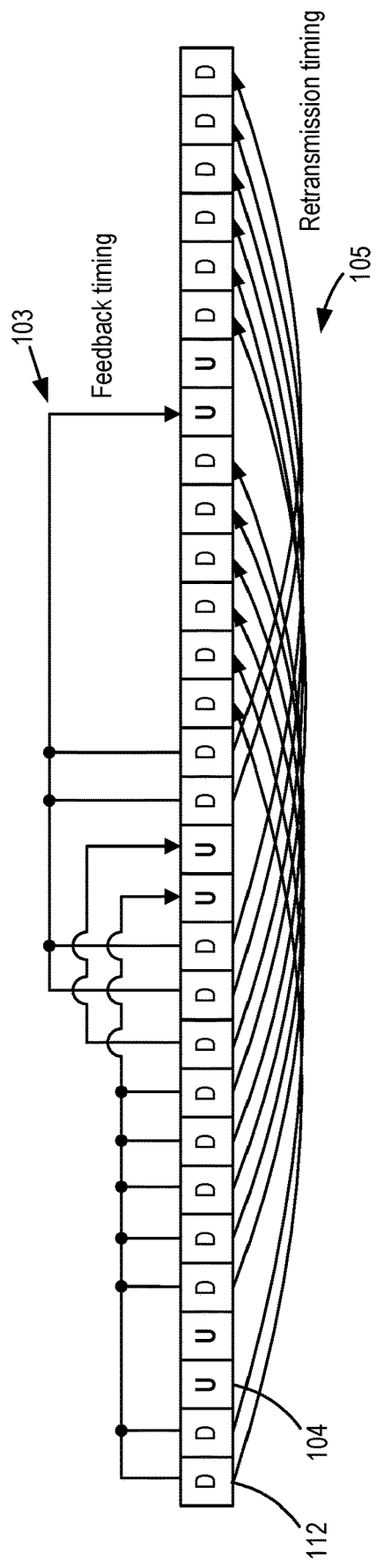
FIG. 1 is a diagram illustrating long term evolution (LTE)-TDD downlink (DL) HARQ process scheduling for an example TDD configuration

Wireless mobile communication technology uses various standards and protocols to generate and/or transmit data between a base station and a wireless communication device. Wireless communication system standards and protocols can include, for example, 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wireless Local Area Network (WLAN) or Wi-Fi. In 3GPP radio access networks (RANs) in LTE systems, a base station may include Evolved Universal Terrestrial Radio Access Network (E-UTRAN) Node B (also commonly denoted as evolved Node B, enhanced Node B, eNodeB, or eNB) and/or Radio Network Controllers (RNCs) in the E-UTRAN, which communicate with a wireless communication device, known as user equipment (UE). In LTE networks, the E-UTRAN may include a plurality of eNodeBs and may communicate with the plurality of UEs. LTE networks include a radio access technology (RAT) and core radio network architecture that can provide high data rate, low latency, packet optimization, and improved system capacity and coverage.

LTE-based technology can be operated in an unlicensed spectrum without requiring an anchor in a licensed spectrum. For example, the LTE-based technology can utilize a MulteFire deployment. A licensed spectrum and an unlicensed spectrum can be defined by the Federal Communications Commission in the U.S., or other government or regulatory entities in other countries or regions. The performance benefits of LTE technology can be combined with Wi-Fi-like deployments to meet the ever-increasing wireless traffic.

Given the uncertainty in future transmission opportunities in the unlicensed spectrum, asynchronous adaptive hybrid automatic repeat request (HARQ) processes can be utilized for the unlicensed band operation. Non-adaptive HARQ may not be of ideal use in the unlicensed spectrum due to high variations in time between retransmissions in unlicensed band operations.

HARQ for unlicensed band operation can be unpredictable due to unpredictable channel access opportunities. Systems operating within the unlicensed band and not in the licensed spectrum may use, for example, time division duplex (TDD) operations. For said systems, the TDD configurations may not be known a priori as in the LTE-TDD system. A TDD configuration may be dynamic and unpredictable, which makes the determination of the number of HARQ processes to use in a transmission burst difficult. A TDD configuration operated in the unlicensed spectrum includes no guaranteed timing relationship between (re)transmission and acknowledgement (ACK)/negative acknowledgement (NACK) feedback messages associated with a HARQ process. Therefore, the ACK/NACK message may need to convey a HARQ identification (ID) to identify an associated HARQ process. As such, there is a need for an efficient way of associating ACK/NACK feedback to a corresponding HARQ process. As used herein, an ACK/NACK feedback message may be referred to simply as an ACK/NACK message.

Reference is now made to the figures, in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIG. 1 is a diagram illustrating LTE-TDD downlink (DL) HARQ process scheduling for an example TDD configuration. FIG. 1 shows a TDD radio frame structure including a plurality of uplink (UL) subframes 104 and a plurality of DL subframes 112. FIG. 1 also shows feedback timing 103 and retransmission timing 105 corresponding to a plurality of HARQ processes for scheduling DL retransmissions. The feedback timing 103 describes an association between the DL transmissions or retransmissions in the DL subframes 112 and the corresponding ACK/NACK messages in the UL subframes 104. The retransmission timing 105 describes a relationship between a DL transmission in one DL subframe 112 and a corresponding retransmission in another DL subframe 112. The retransmission can occur, for example, based on receiving a NACK message associated with the HARQ process.

In an LTE-TDD scheme, as shown in FIG. 1, the UL subframes 104 and the DL subframes 112 can be continuous (i.e., without gaps). Each HARQ DL process corresponds to one or more DL transmissions based on the feedback timing 103 and the retransmission timing 105. A particular DL HARQ process may include, for example, a transmission in a DL subframe 112, feedback in a corresponding ACK/NACK message in a scheduled UL subframe 104 based on the feedback timing 103, and a retransmission (if NACK feedback is reported) in another DL subframe 112 based on the retransmission timing 105. Persons skilled in the art will recognize that a HARQ process may not be limited to a single retransmission. Rather, the HARQ process may include a series of retransmissions and corresponding ACK/NACK messages (e.g., up to a maximum number of allowed HARQ retransmissions).

In LTE-TDD a DL/UL HARQ process configuration can be described as follows. An LTE-TDD UL/DL configuration 0 can include four DL HARQ processes and seven UL HARQ processes. An LTE-TDD UL/DL configuration 1 can include seven DL HARQ processes and four UL HARQ processes. An LTE-TDD UL/DL configuration 2 can include 10 DL HARQ processes and two UL HARQ processes. An LTE-TDD UL/DL configuration 3 can include nine DL HARQ processes and three UL HARQ processes. An LTE-TDD UL/DL configuration 4 can include 12 DL HARQ processes and two UL HARQ processes. An LTE-TDD UL/DL configuration 5 can include 15 DL HARQ processes and one UL HARQ process. An LTE-TDD UL/DL configuration 6 can include six DL HARQ processes and six UL HARQ processes.

That is, the quantity of DL/UL HARQ processes can vary in LTE-TDD according to a selected configuration. FIG. 1 shows an LTE-TDD UL/DL configuration 4. As such, 12 DL HARQ processes are shown in FIG. 1.

Figure 2:
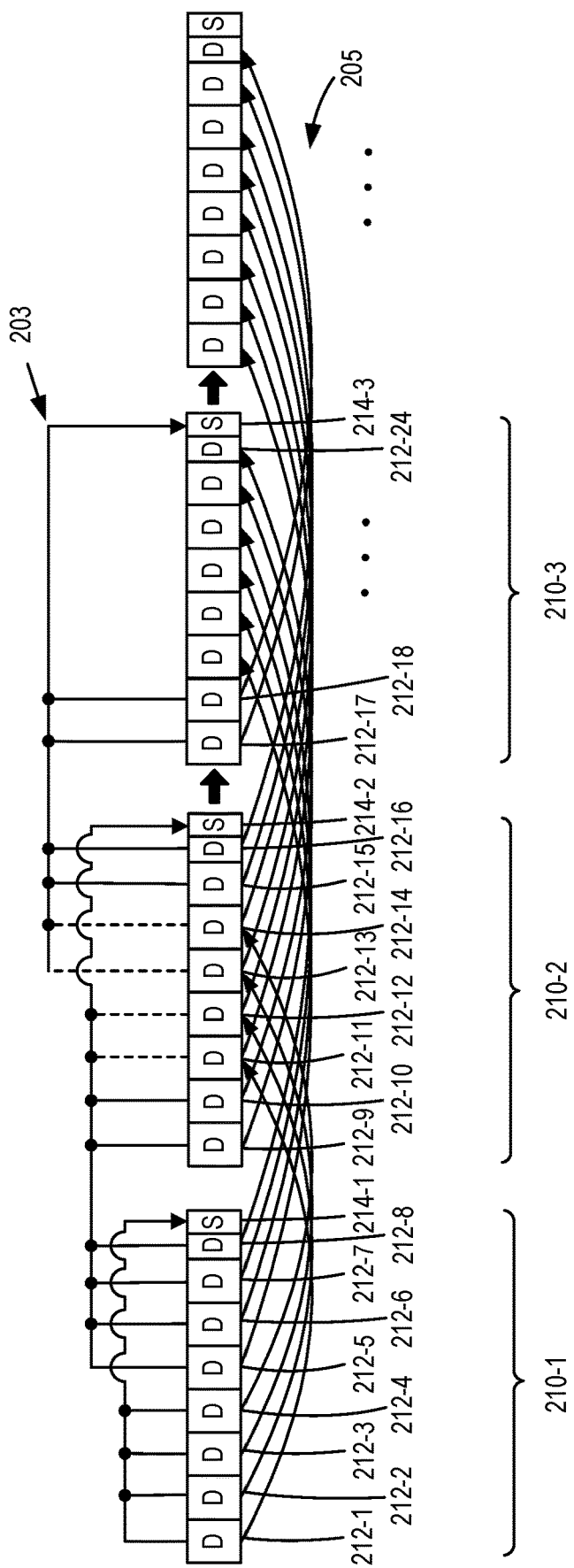
FIG. 2 is a diagram illustrating TDD DL HARQ process scheduling in an unlicensed spectrum according to one embodiment.

FIG. 2 is a diagram illustrating TDD DL HARQ process scheduling in an unlicensed spectrum according to one embodiment. FIG. 2 shows a TDD radio frame structure including a plurality of uplink (UL) subframes 214-1, 214-2, and 214-3, referred to generally as UL subframes 214; a plurality of DL subframes 212-1 to 212-24, referred to generally as DL subframes 212; and transmission bursts 210-1, 210-2, and 210-3, referred to generally as transmission bursts 210. FIG. 2 also shows feedback timing 203 and retransmission timing 205 corresponding to a plurality of HARQ processes for scheduling DL retransmissions. The feedback timing 203 describes an association between the DL transmissions or retransmissions in the DL subframes 212 and the corresponding ACK/NACK messages in the UL subframes 204. The retransmission timing 205 describes a relationship between a DL transmission in a DL subframe from the DL subframes 212 and a corresponding retransmission in another DL subframe from the DL subframes 212. The retransmission can occur, for example, based on receiving a NACK message associated with the HARQ process.

In some examples, a quantity of HARQ processes utilized in a DL/UL transmission can depend on the maximum channel occupancy time (MCOT), the unlicensed band channel situation, a DL/UL traffic ratio, and/or a gap between consecutive transmission bursts. As used herein, the MCOT can define a maximum time that an evolved node B (eNodeB) (e.g., or other RAN node) can utilize to transmit DL messages in a transmission burst to a UE and/or a maximum time that the UE can utilize to transmit UL messages in a transmission burst to the eNodeB. The MCOT can be used to determine a quantity of subframes in a transmission burst. As such, a quantity of HARQ processes utilized in a DL/UL transmission can depend on a quantity of subframes in a transmission burst.

A DL/UL traffic ratio can describe a ratio between DL transmissions and UL transmissions in a transmission burst. A gap between consecutive transmission bursts can describe a duration of time between consecutive transmission bursts and/or a quantity of subframes between the last subframe of a first transmission burst and a first subframe of a second transmission burst.

The MCOT can influence the HARQ processes used. For example, as the MCOT increases, the quantity of HARQ processes can also increase. The DL/UL traffic ratio can also influence the HARQ processes used. If the DL/UL traffic ratio is asymmetric (e.g., DL heavy or UL heavy), then a greater quantity of DL HARQ processes or UL HARQ processes can be utilized, as there will be more DL subframes or UL subframes, as compared to the quantity of DL HARQ processes or UL HARQ processes utilized in symmetric DL/UL traffic ratios. As the transmission gap increases, then the quantity of HARQ processes utilized can also increase due to a delay in feedback.

A quantity of supported DL/UL HARQ processes can be configured by an eNodeB. The eNodeB can provide configuration messages to a UE to inform the UE of the quantity of supported DL/UL HARQ processes. HARQ process IDs can begin at one and can increment to reflect the quantity of supported DL/UL HARQ processes. In some examples, the HARQ process IDs may be provided in the configuration messages. In other examples, the HARQ process IDs are not provided in the configuration message. The configuration message can be provided to the UE via an L1/L2 in a physical downlink control channel (PDCCH), via a medium access control (MAC) control element (CE), via radio resource control (RRC) signaling, or another higher layer signaling.

In FIG. 2, the MCOT has a value of 8 milliseconds (ms) (e.g., assuming 1 ms subframes). That is, each of the transmission bursts 210 can span 8 ms. Each of the transmission bursts 210 can be associated with a plurality of subframes from the DL subframes 212 and the UL subframes 214.

The MCOT can be used to determine a quantity of subframes in a transmission burst. An MCOT with a value of 8 ms can be used to determine that eight subframes can be included in each of the transmission bursts 210.

The transmission burst 210-1 can span DL subframes 212-1, 212-2, 212-3, 212-4, 212-5, 212-6, 212-7, and 212-8, and UL subframe 214-1. The transmission burst 210-2 can span DL subframes 212-9, 212-10, 212-11, 212-12, 212-13, 212-14, 212-15, and 212-16, and UL subframe 214-2. The transmission burst 210-3 can span DL subframes 212-17, 212-18 to 212-24, and UL subframe 214-3.

In some examples, the quantity of the HARQ processes can be determined based on the quantity of subframes 212. For example, if a transmission burst comprises eight subframes, then 14 HARQ processes can be utilized for the TDD HARQ process configuration.

For example, a first HARQ process with an associated HARQ process ID can be scheduled for a DL transmission in subframe 212-1 and a new transmission or retransmission with a same HARQ process ID can be scheduled for a DL transmission in subframe 212-11. A second HARQ process with an associated HARQ process ID can be scheduled for a DL transmission in subframe 212-2, and a new transmission or retransmission with a same HARQ process ID can be scheduled for a DL transmission in subframe 212-12. A third HARQ process with an associated HARQ process ID can be scheduled for a DL transmission in subframe 212-3, and a new transmission or retransmission with a same HARQ process ID can be scheduled for a DL transmission in subframe 212-13. A fourth HARQ process with an associated HARQ process ID can be scheduled for a DL transmission in subframe 212-4, and a new transmission or retransmission with a same HARQ process ID can be scheduled for a DL transmission in subframe 212-14.

A fifth HARQ process with an associated HARQ process ID can be scheduled for a DL transmission in subframe 212-5. A sixth HARQ process with an associated HARQ process ID can be scheduled for a DL transmission in subframe 212-6. A seventh HARQ process with an associated HARQ process ID can be scheduled for a DL transmission in subframe 212-7. An eighth HARQ process with an associated HARQ process ID can be scheduled for a DL transmission in subframe 212-8. A ninth HARQ process with an associated HARQ process ID can be scheduled for a DL transmission in subframe 212-9. A tenth HARQ process with an associated HARQ process ID can be scheduled for a DL transmission in subframe 212-10. An eleventh HARQ process with an associated HARQ process ID can be scheduled for a DL transmission in subframe 212-15. A twelfth HARQ process with an associated HARQ process ID can be scheduled for a DL transmission in subframe 212-16. A thirteenth HARQ process with an associated HARQ process ID can be scheduled for a DL transmission in subframe 212-17. A fourteenth HARQ process with an associated HARQ process ID can be scheduled for a DL transmission in subframe 212-18.

In FIG. 2, the feedback timing 203 shown with dotted lines can be retransmissions of a HARQ process associated with an associated HARQ process ID. For example, the DL transmission transmitted in the subframe 212-11 can be a retransmission of a DL transmission transmitted in the subframe 212-1 that is associated with the HARQ process with an associated HARQ process ID. The DL transmission transmitted in the subframe 212-11 can also be a new transmission associated with a HARQ process with an associated HARQ process ID.

The HARQ processes can include an ACK/NACK message scheduled to be received by an associated eNodeB at the UL subframes 214. That is, a UE can generate and/or provide an ACK/NACK message in the subframes 214.

The ACK/NACK messages associated with the DL transmissions provided in the DL subframes 212-1, 212-2, 212-3, and 212-4 can be processed and/or received in the subframe 214-1. The ACK/NACK messages associated with the DL transmissions provided in the DL subframes 212-5, 212-6, 212-7, 212-8, 212-9, 212-10, 212-11, and 212-12 can be processed and/or received in the subframe 214-2. The ACK/NACK messages associated with the DL transmissions provided in the DL subframes 212-13, 212-14, 212-15, 212-16, 212-17, and 212-18 can be processed and/or received in subframe 214-3.

In a number of examples, the last subframes of the transmission bursts 210 can be divided into half subframes comprising the UL subframes 214-1, 214-2, and 214-3 and the DL subframes 212-8, 212-16, and 212-24, respectively. As such, each of the last subframes of the transmission bursts 210 can be scheduled for a UL transmission and a DL transmission. In some examples, the DL transmission can be provided through a short physical uplink control channel (sPUCCH). The sPUCCH can be used to transmit two or four symbols conveying uplink control information (UCI) and/or ACK/NACK messages.

The ACK/NACK transmitted in a UL subframe (e.g., UL subframes 214-1, 214-2, and 214-3) can provide ACK/NACK for the DL transmissions transmitted in the 1 to n-3 subframes in a transmission burst, where n is an index associated with the UL subframe and/or n-3 to n subframes in a previous transmission burst. For example, the UL subframe 214-2 can be used to transmit a UL subframe comprising ACK/NACK messages for the DL transmissions transmitted in the DL subframes 212-9, 212-10, 212-11, and 212-12, and the DL subframes 212-5, 212-6, 212-7, and 212-8.

A transmitting condition associated with the TDD DL/UL HARQ processes scheduling can include a subframe gap of a single subframe between transmission bursts 210. In some examples, more or fewer subframes can comprise the subframe gap.

The retransmissions of HARQ transmissions can begin at a third DL subframe in a transmission burst and can end at a sixth subframe of the transmission burst, given a single subframe between transmission bursts 210. For example, the retransmissions of DL transmissions provided in DL subframes 212-1, 212-2, 212-3, and 212-4 occur in DL subframes 212-11, 212-12, 212-13, and 212-14, which are the third, fourth, fifth, and sixth subframes in transmission burst 210-2.

Figure 3:
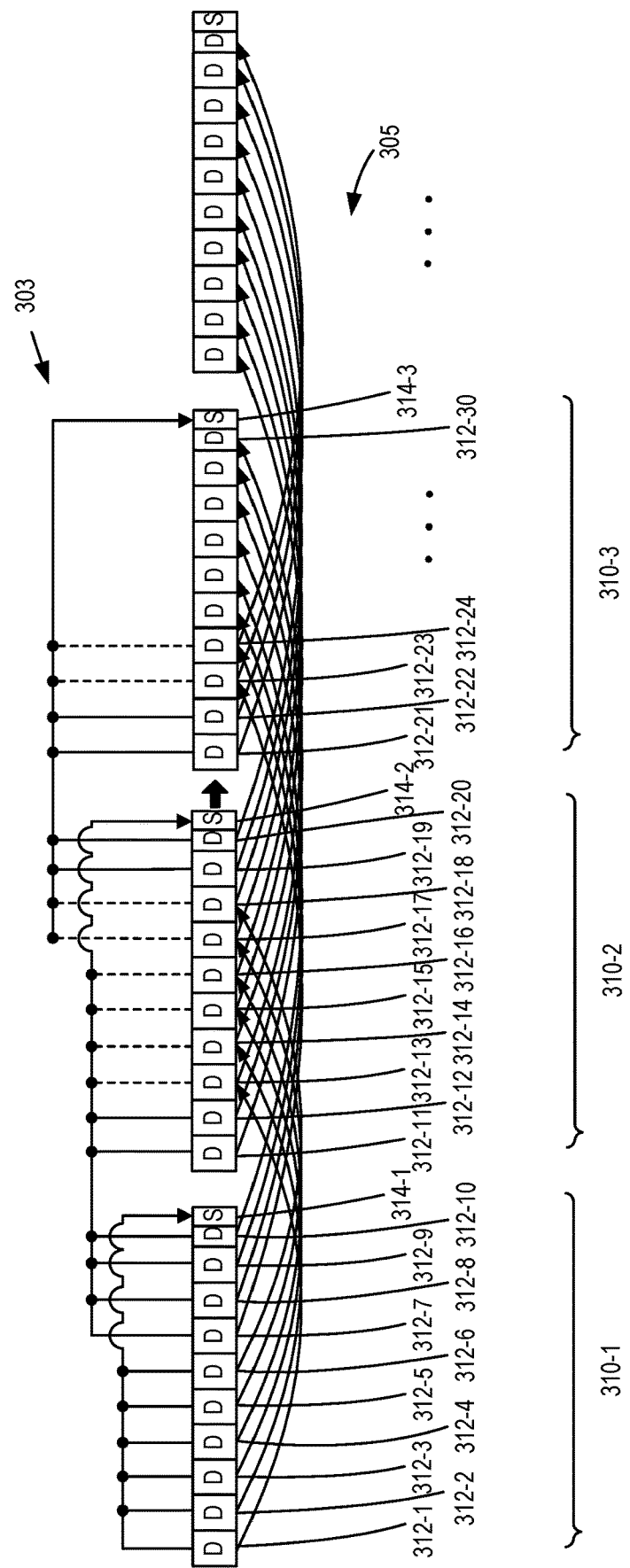
FIG. 3 is a diagram illustrating TDD HARQ process scheduling in an unlicensed spectrum according to one embodiment.

FIG. 3 is a diagram illustrating TDD HARQ process scheduling in an unlicensed spectrum according to one embodiment. FIG. 3 shows a TDD radio frame structure including a plurality of uplink (UL) subframes 314-1, 314-2, and 314-3, referred to generally as UL subframes 314; a plurality of DL subframes 312-1 to 312-30, referred to generally as DL subframes 312; and transmission bursts 310-1, 310-2, and 310-3, referred to generally as transmission bursts 310. FIG. 3 also shows feedback timing 303 and retransmission timing 305 corresponding to a plurality of HARQ processes for scheduling DL retransmissions. The feedback timing 303 describes an association between the DL transmissions or retransmissions in the DL subframes 312 and the corresponding ACK/NACK messages in the UL subframes 314. The retransmission timing 305 describes a relationship between a DL transmission in a DL subframe from the DL subframes 312 and a corresponding retransmission in another DL subframe from the DL subframes 312. The retransmission can occur, for example, based on receiving a NACK message associated with the HARQ process.

The transmission burst 310-1 can span DL subframes 312-1, 312-2, 312-3, 312-4, 312-5, 312-6, 312-7, 312-8, 312-9, and 312-10, and UL subframe 314-1. The transmission burst 310-2 can span DL subframes 312-11, 312-12, 312-13, 312-14, 312-15, 312-16, 312-17, 312-18, 312-19, and 312-20, and UL subframe 314-2. The transmission burst 310-3 can span DL subframes 312-21, 312-22, 312-23, 312-24 to 312-30, and UL subframe 314-3.

In FIG. 3, the MCOT can have a value of 10 ms in the absence of any other technologies sharing the carrier on a long-term basis. The 10 ms can be used to determine that 10 subframes can comprise each of the transmission bursts 310. The 10 subframes in each transmission burst can be used to determine that the quantity of HARQ processes to activate for DL transmissions is 16.

For example, a first HARQ process with an associated HARQ process ID can be scheduled for a DL transmission in the subframe 312-1 and a new transmission or retransmission with a same HARQ process ID can be scheduled for a DL transmission in the subframe 312-13. A second HARQ process with an associated HARQ process ID can be scheduled for a DL transmission in the subframe 312-2, and a new transmission or retransmission with a same HARQ process ID can be scheduled for a DL transmission in the subframe 312-14. A third HARQ process with an associated HARQ process ID can be scheduled for a DL transmission in the subframe 312-3, and a new transmission or retransmission with a same HARQ process ID can be scheduled for a DL transmission in the subframe 312-15. The fourth HARQ process with an associated HARQ process ID can be scheduled for a DL transmission in the subframe 312-4, and a new transmission or retransmission with a same HARQ process ID can be scheduled for a DL transmission in the subframe 312-16.

A fifth HARQ process with an associated HARQ process ID can be scheduled for a DL transmission in the subframe 312-5, and a new transmission or retransmission with a same HARQ process ID can be scheduled for a DL transmission in the subframe 312-17. A sixth HARQ process with an associated HARQ process ID can be scheduled for a DL transmission in the subframe 312-6, and a new transmission or retransmission with a same HARQ process ID can be scheduled for a DL transmission in the subframe 312-18. A seventh HARQ process with an associated HARQ process ID can be scheduled for a DL transmission in the subframe 312-7, and a new transmission or retransmission with a same HARQ process ID can be scheduled for a DL transmission in the subframe 312-23. An eighth HARQ process with an associated HARQ process ID can be scheduled for a DL transmission in the subframe 312-8, and a new transmission or retransmission with a same HARQ process ID can be scheduled for a DL transmission in the subframe 312-24.

A ninth HARQ process with an associated HARQ process ID can be scheduled for a DL transmission in the subframe 312-9. The tenth HARQ process with an associated HARQ process ID can be scheduled for a DL transmission in the subframe 312-10. The eleventh HARQ process with an associated HARQ process ID can be scheduled for a DL transmission in the subframe 312-11. A twelfth HARQ process with an associated HARQ process ID can be scheduled for a DL transmission in the subframe 312-12. A thirteenth HARQ process with an associated HARQ process ID can be scheduled for a DL transmission in the subframe 312-19. A fourteenth HARQ process with an associated HARQ process ID can be scheduled for a DL transmission in the subframe 312-20. A fifteenth HARQ process with an associated HARQ process ID can be scheduled for a DL HARQ transmission in the subframe 312-21. A sixteenth HARQ process with an associated HARQ process ID can be scheduled for a DL transmission in the subframe 312-22.

In some examples, there can be more HARQ processes than the size of a soft-buffer of a UE. As used herein, the soft-buffer can describe the buffer used to store ACK/NACK transmission data such as a plurality of ACK/NACK messages. If the quantity of HARQ processes exceeds the size of a soft-buffer of a UE then limited buffer rate matching can be performed.

In some examples, a HARQ operation for a system operating in an unlicensed band can be defined as follows. $N_{max}^{HARQ}$ is a maximum quantity (e.g., number) of HARQ processes supported. In some examples, $N_{max}^{HARQ}$ can be equal to 16. $N_{max,feedback}^{HARQ}$ is a maximum HARQ ACK/NACK feedback payload size per codeword supported, where $N_{max,feedback}^{HARQ} \leq N_{max}^{HARQ}$. $N_{soft-buffer-partition}^{HARQ}$ is a quantity of active HARQ processes which is configured in a UE specific manner; this determines rate matching where $N_{soft-buffer-partition}^{HARQ} \leq N_{max}^{HARQ}$. $N_{feedback}^{HARQ}$ is a HARQ ACK/NACK feedback bitmap size in (s)PUCCH, where $N_{feedback}^{HARQ} \leq N_{max,feedback}^{HARQ}$ and $N_{feedback}^{HARQ} \leq N_{soft-buffer-partition}^{HARQ}$. HARQ ACK feedback bundling can be implicit or overwritten explicitly by DL/UL grant over processes or over codewords. A bitmap and HARQ ACK/NACK feedback bundling are further described in FIG. 4.

Although FIGS. 2 and 3 are provided in terms of DL transmissions, the examples provided in FIGS. 2 and 3 can be applied to UL transmissions.

Figure 4:
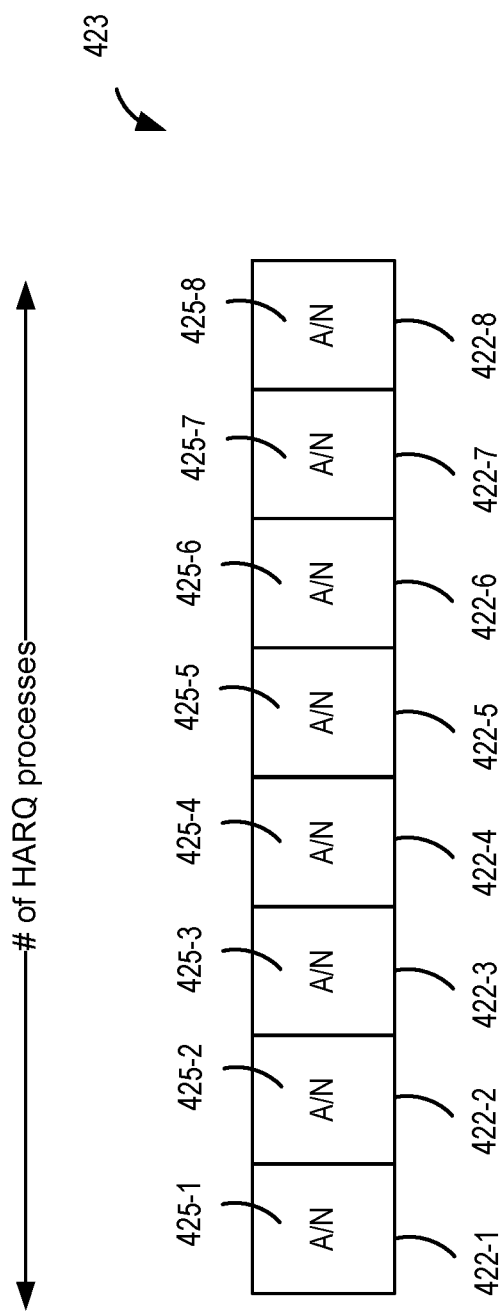
FIG. 4 is a diagram illustrating a transmission according to one embodiment.

FIG. 4 is a diagram illustrating a transmission according to one embodiment. FIG. 4 includes a transmission 423 of ACK/NACK (e.g., A/N) messages 425-1, 425-2, 425-3, 425-4, 425-5, 425-6, 425-7, and 425-8, referred to generally as ACK/NACK messages 425. FIG. 4 also includes positions 422-1, 422-2, 422-3, 422-4, 422-5, 422-6, 422-7, and 422-8 of the transmission 423, referred to generally as positions 422.

Since fixed timing between a DL transmission (or retransmission) associated with a HARQ process and an associated ACK/NACK message cannot be guaranteed, the HARQ process ID can be used to associate the ACK/NACK message with the DL transmission. One way of associating a HARQ process ID with an ACK/NACK message is through a bitmap. A bitmap can associate an index (e.g., position in the bitmap) with an ACK/NACK message and with an associated HARQ process. As used herein, a bitmap is an ordered plurality of indexes that are associated with a plurality of HARQ processes, HARQ process IDs, and/or ACK/NACK messages.

Figure 5:
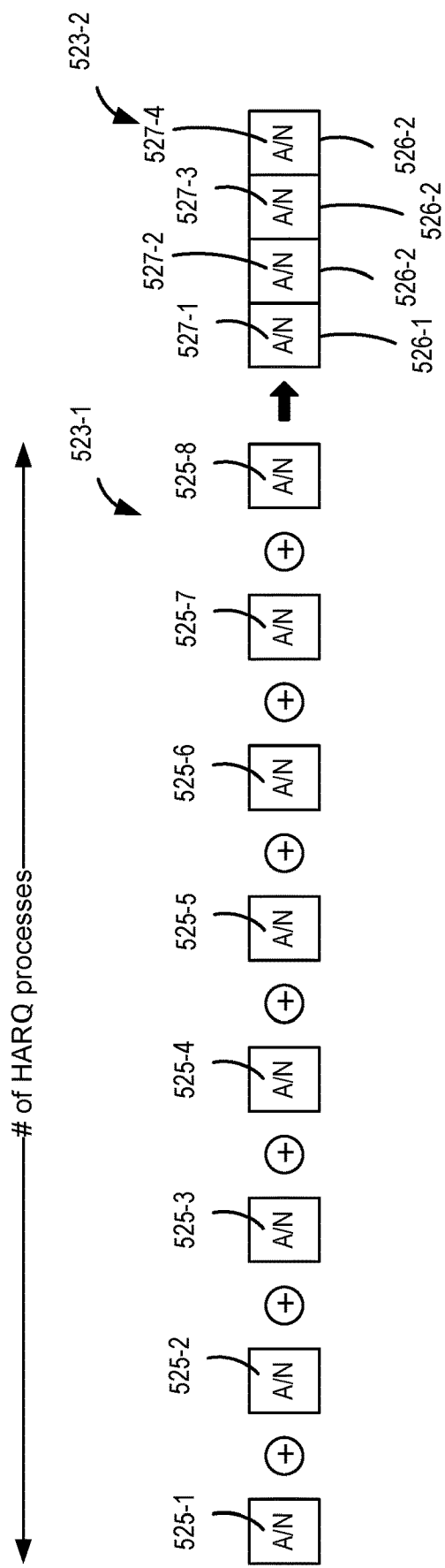
FIG. 5 is a diagram illustrating a transmission according to one embodiment.

The bitmap size can be adjusted based on the plurality of HARQ processes. For example, the bitmap size can be adjusted based on the quantity of HARQ processes used in the TDD HARQ processes configuration, the maximum quantity of HARQ processes, and/or an active quantity of HARQ processes. For example, a bitmap, associated with the transmission 423, can be divided into eight positions, with each position having an index. The division of the bitmap can be based on the quantity of HARQ processes being eight as shown in FIG. 5. The size of the bitmap can be configured by an eNodeB.

The position of the ACK/NACK messages 425 in the transmission 423 can be correlated with the positions of a bitmap. For example, a first position in a bitmap can correspond to a first position 422-1 of the transmission 423, a second position in a bitmap can correspond to a second position 422-2 of the transmission 423, a third position in a bitmap can correspond to the third position 422-3 of the transmission 423, a fourth position in a bitmap can correspond to the fourth position 422-4 of the transmission 423, a fifth position in a bitmap can correspond to the fifth position 422-5 of the transmission 423, a sixth position in a bitmap can correspond to the sixth position 422-6 of the transmission 423, a seventh position in a bitmap can correspond to the seventh position 422-7 of the transmission 423, and an eighth position in a bitmap can correspond to the eighth position 422-8 of the transmission 423.

As such, a position of an ACK/NACK message in the transmission 423 can be associated with a HARQ process via a bitmap. For example, the ACK/NACK message 425-1 in the position 422-1 of the transmission 423 can be associated with a first HARQ process and/or a first HARQ process ID through a bitmap that associates a first position of the bitmap with the first HARQ process and/or the first HARQ process ID. The ACK/NACK message 425-2 in the position 422-2 of the transmission 423 can be associated with a second HARQ process and/or a second HARQ process ID through a bitmap that associates a second position of the bitmap with the second HARQ process and/or the second HARQ process ID. The ACK/NACK message 425-3 in the position 422-3 of the transmission 423 can be associated with a third HARQ process and/or a third HARQ process ID through a bitmap that associates a third position of the bitmap with the third HARQ process and/or the third HARQ process ID. The ACK/NAK message 425-4 in the position 422-4 of the transmission 423 can be associated with a fourth HARQ process and/or a fourth HARQ process ID through a bitmap that associates a fourth position of the bitmap with the fourth HARQ process and/or the fourth HARQ process ID.

The ACK/NACK message 425-5 in the position 422-5 of the transmission 423 can be associated with a fifth HARQ process and/or a fifth HARQ process ID through a bitmap that associates a fifth position of the bitmap with the fifth HARQ process and/or the fifth HARQ process ID. The ACK/NACK message 425-6 in the position 422-6 of the transmission 423 can be associated with a sixth HARQ process and/or a sixth HARQ process ID through a bitmap that associates a sixth position of the bitmap with the sixth HARQ process and/or the sixth HARQ process ID. The ACK/NACK message 425-7 in the position 422-7 of the transmission 423 can be associated with a seventh HARQ process and/or a seventh HARQ process ID through a bitmap that associates a seventh position of the bitmap with the seventh HARQ process and/or the seventh HARQ process ID. The ACK/NACK message 425-8 in the position 422-8 of the transmission 423 can be associated with an eighth HARQ process and/or an eighth HARQ process ID through a bitmap that associates an eighth position of the bitmap with the eighth HARQ process and/or the eighth HARQ process ID.

This provides an eNodeB with the ability to associate the ACK/NACK messages 425 that are received without an explicitly associated HARQ process and/or a HARQ process ID with a HARQ process and/or a HARQ process ID.

FIG. 5 is a diagram illustrating a transmission according to one embodiment. FIG. 5 includes ACK/NACK messages 525-1, 525-2, 525-3, 525-4, 525-5, 525-6, 525-7, and 525-8, referred to generally as ACK/NACK messages 525. FIG. 5 also includes transmissions 523-1 and 523-2. FIG. 5 further includes bundled ACK/NACK messages 527-1, 527-2, 527-3, and 527-4, referred to generally as bundled messages 527, and positions 526-1, 526-2, 526-3, and 526-4 of transmission 523-2, referred to generally as positions 526. FIG. 5 shows a composition of a potential transmission 523-1 and a composition of the transmission 523-2.

In a number of examples, continuous ACK/NACK messages 525 can be bundled for a transmission 523-2. The ACK/NACK messages 525 can be continuous if the corresponding HARQ processes and/or the HARQ process IDs are continuous.

The plurality of ACK/NACK messages 525 are bundled into the bundled messages 527. Bundling the ACK/NACK messages 525 can include generating a single ACK/NACK message from two or more ACK/NACK messages 525. For example, the ACK/NACK messages 525-1 and 525-2 are bundled into an ACK/NACK message 527-1, the ACK/NACK messages 525-3 and 525-4 are bundled into ACK/NACK message 527-2, the ACK/NACK messages 525-5 and 525-6 are bundled into ACK/NACK message 527-3, and the ACK/NACK messages 525-7 and 525-8 are bundled into ACK/NACK message 527-4.

If the ACK/NACK message 525-1 has an ACK value and the ACK/NACK message 525-2 has an ACK value, then the bundled ACK/NACK message 527-1 can have an ACK value. As such, the next transmissions associated with the HARQ processes corresponding to the ACK/NACK messages 525-1 and 525-2 can be new HARQ transmissions and not retransmissions. If either of the ACK/NACK messages 525-1 and 525-2 has a NACK value, then the bundled ACK/NACK message 527-1 can have a NACK value. As such, the next transmissions associated with the HARQ processes corresponding to the ACK/NACK messages 525-1 and 525-2 can be retransmissions.

Bundling can reduce the feedback payload without sacrificing the performance much. For example, the payload of the transmission 523-2 can comprise four ACK/NACK messages 527 instead of eight ACK/NACK messages 525.

In bundling ACK/NACK messages information may be lost. For example, if a first ACK/NACK message with an ACK value and a second ACK/NACK message with a NACK value are bundled, then a retransmission may be performed for HARQ processes associated with the first ACK/NACK message needlessly. In some examples, not all of the HARQ processes associated with the ACK/NACK messages may be active such that the inefficiencies of bundling may be reduced.

The positions 526 of the bundled ACK/NACK messages 527 in the transmission 523-2 can be used to correlate the bundled ACK/NACK messages 527 and/or the ACK/NACK messages 525 with one or more HARQ processes through the use of a bitmap. For example, a bitmap can correlate a first position 526 with HARQ processes corresponding to ACK/NACK messages 525-1 and 525-2.

Figure 6:
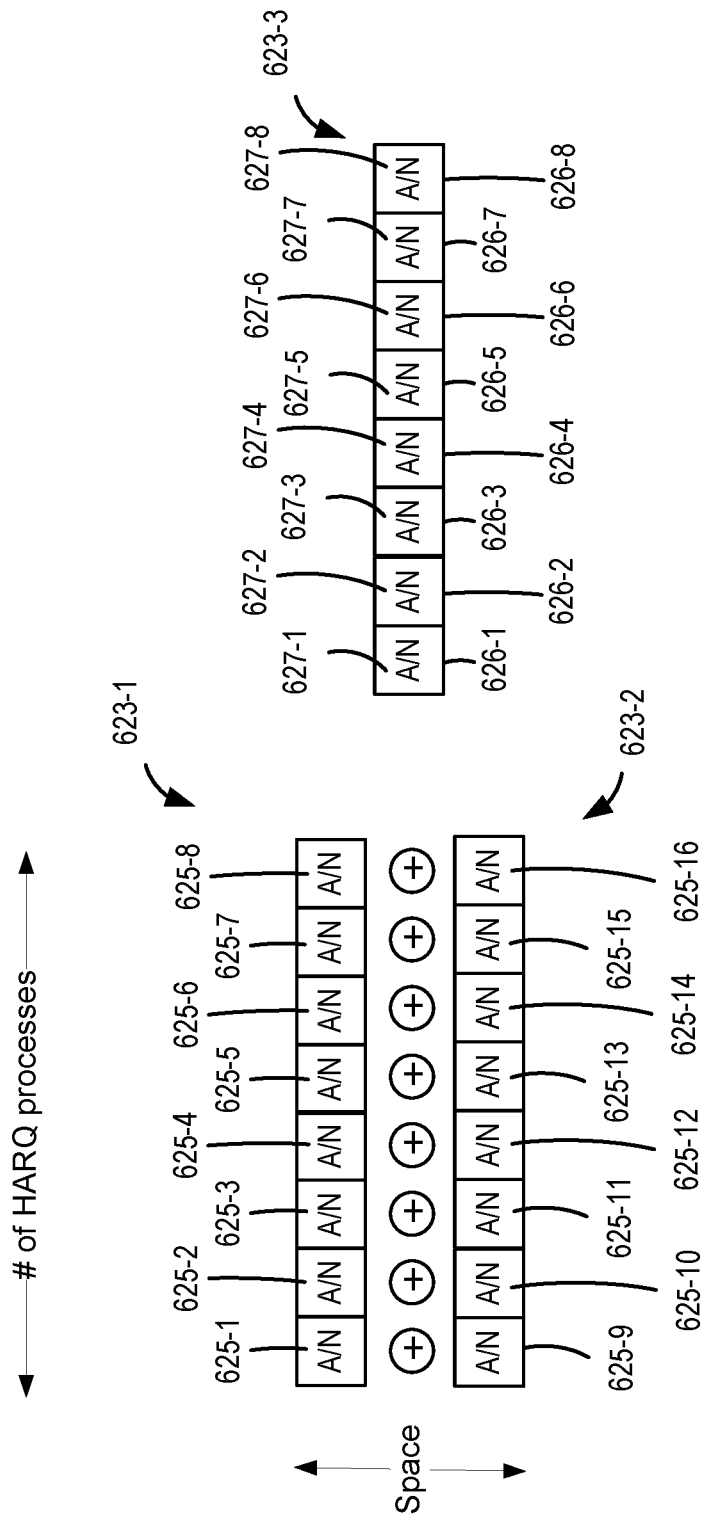
FIG. 6 is a diagram illustrating a transmission according to one embodiment.

FIG. 6 is a diagram illustrating a transmission according to one embodiment. FIG. 6 includes ACK/NACK messages 625-1, 625-2, 625-3, 625-4, 625-5, 625-6, 625-7, 625-8, 625-9, 625-10, 625-11, 625-12, 625-13, 625-14, 625-15, and 625-16, referred to generally as ACK/NACK messages 625. FIG. 6 also includes transmissions 623-1, 623-2, and 623-3. FIG. 6 further includes bundled ACK/NACK messages 627-1, 627-2, 627-3, 627-4, 627-5, 627-6, 627-7, and 627-8, referred to generally as bundled ACK/NACK messages 627, and positions 626-1, 626-2, 626-3, 626-4, 626-5, 626-6, 626-7, and 626-8 of transmission 623-3. FIG. 6 shows a composition of the potential transmission 623-1, a composition of the potential transmission 623-2, and a composition of the transmission 623-3.

FIG. 6 shows bundling over codewords. For example, the transmission 623-1 is transmitted in a first frequency and the transmission 623-2 is transmitted in a second frequency at a same time, then the ACK/NACK messages 625-1, 625-2, 625-3, 625-4, 625-5, 625-6, 625-7, and 625-8 can be bundled with the ACK/NACK messages 625-9, 625-10, 625-11, 625-12, 625-13, 625-14, 625-15, and 625-16, respectively.

The ACK/NACK messages 625-1 and 625-9 can be bundled to generate the bundled ACK/NACK message 627-1, the ACK/NACK messages 625-2 and 625-10 can be bundled to generate the bundled ACK/NACK message 627-2, the ACK/NACK messages 625-3 and 625-11 can be bundled to generate the bundled ACK/NACK message 627-3, the ACK/NACK messages 625-4 and 625-12 can be bundled to generate the bundled ACK/NACK message 627-4, the ACK/NACK messages 625-5 and 625-13 can be bundled to generate the bundled ACK/NACK message 627-5, the ACK/NACK messages 625-6 and 625-14 can be bundled to generate the bundled ACK/NACK message 627-6, the ACK/NACK messages 625-7 and 625-15 can be bundled to generate the bundled ACK/NACK message 627-7, and the ACK/NACK messages 625-8 and 625-16 can be bundled to generate the bundled ACK/NACK message 627-8.

In the example provided in FIG. 6, the ACK/NACK messages 627 that are bundled together do not have to be continuous. In some examples, the bundling as described in FIG. 5 can be combined with the bundling as described in FIG. 6. In such examples, each bundled ACK/NACK message can be associated with at least four HARQ processes.

Figure 7:
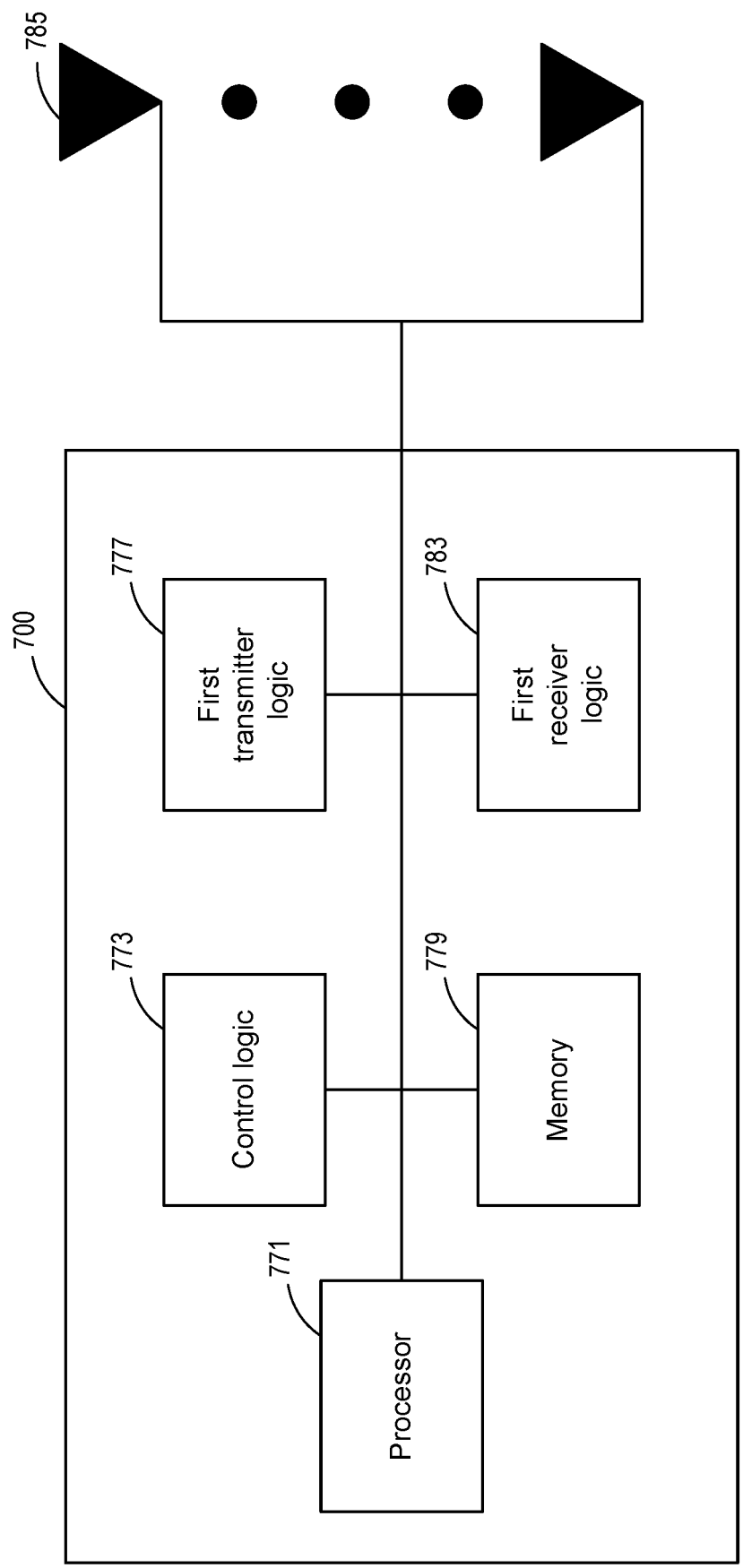
FIG. 7 is a block diagram illustrating electronic device circuitry that may be eNodeB circuitry, user equipment (UE) circuitry, network node circuitry, or some other type of circuitry according to one embodiment.

FIG. 7 is a block diagram illustrating electronic device circuitry that may be eNodeB circuitry, user equipment (UE) circuitry, network node circuitry, or some other type of circuitry according to one embodiment. FIG. 7 illustrates an electronic device 700 that may be, or may be incorporated into or otherwise part of, an eNodeB, a UE, or some other type of electronic device in accordance with various embodiments. Specifically, the electronic device 700 may be logic and/or circuitry that may be at least partially implemented in one or more of hardware, software, and/or firmware. In embodiments, the electronic device logic may include radio transmit/transmitter logic (e.g., a first transmitter logic 777) and receive/receiver logic (e.g., a first receiver logic 783) coupled to a control logic 773 and/or a processor 771. In embodiments, the transmit/transmitter and/or receive/receiver logic may be elements or modules of transceiver logic. The first transmitter logic 777 and the first receiver logic 783 may be housed in separate devices. For example, the first transmitter logic 777 can be incorporated into a first device while the first receiver logic 783 is incorporated into a second device, or the first transmitter logic 777 and the first receiver logic 783 can be incorporated into a device separate from a device including any combination of the control logic 773, a memory 779, and/or the processor 771. The electronic device 700 may be coupled with or include one or more antenna elements 785 of one or more antennas. The electronic device 700 and/or the components of the electronic device 700 may be configured to perform operations similar to those described elsewhere in this disclosure.

In embodiments where the electronic device 700 implements, is incorporated into, or is otherwise part of a UE and/or an eNodeB, or a device portion thereof, the electronic device 700 can generate and/or transmit polar codes. The processor 771 may be coupled to the first receiver and first transmitter. The memory 779 may be coupled to the processor 771 having control logic instructions thereon that, when executed, generate and/or transmit polar codes.

In embodiments where the electronic device 700 receives data, generates data, and/or transmits data to/from a UE to implement a DL or UL signal including transmissions associated with HARQ processes, the processor 771 may be coupled to a receiver and a transmitter. The memory 779 may be coupled to the processor 771 having the control logic instructions thereon that, when executed, may be able to configure a TDD HARQ process configuration.

As used herein, the term "logic" may refer to, be part of, or include an application specific integrated circuit (ASIC), an electronic circuit, the processor 771 (shared, dedicated, or group), and/or the memory 779 (shared, dedicated, or group) that execute one or more software or firmware programs, a combinational logic circuit, and/or other suitable hardware components that provide the described functionality. Specifically, the logic may be at least partially implemented in, or an element of, hardware, software, and/or firmware. In some embodiments, the electronic device logic may be implemented in, or functions associated with the logic may be implemented by, one or more software or firmware modules.

Figure 8:
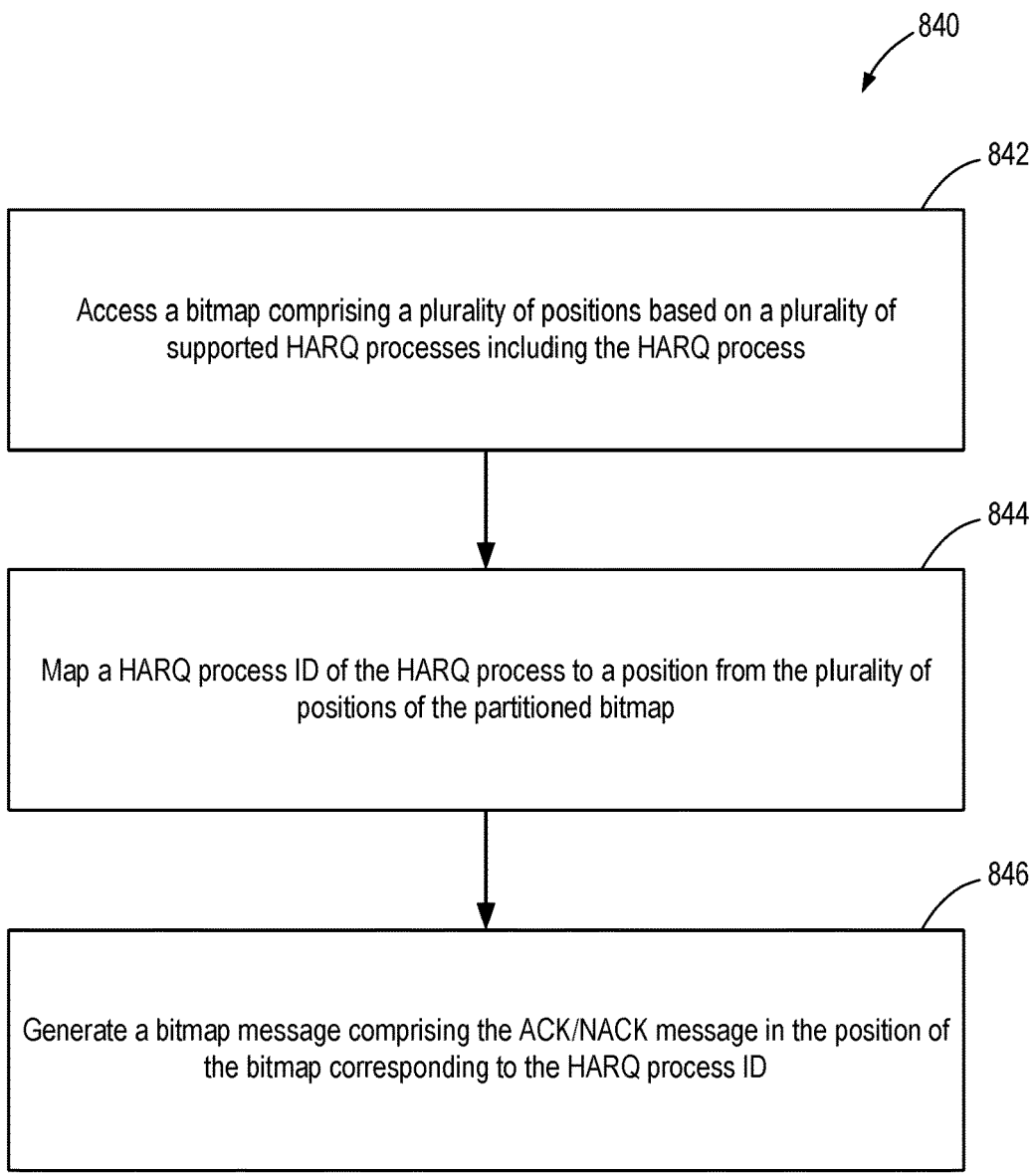
FIG. 8 is a block diagram illustrating a method for generating a bitmap message according to one embodiment.

FIG. 8 is a block diagram illustrating a method for generating a bitmap message according to one embodiment. The method 840 includes accessing 842 a bitmap comprising a plurality of positions based on a plurality of supported HARQ processes, mapping 844 a HARQ process ID of the HARQ process to a position from the plurality of positions of the partitioned bitmap, and generating 846 a bitmap message comprising the ACK/NACK message at the position of the bitmap corresponding to the HARQ process ID. Each of the plurality of positions of a bitmap can correspond with at least a different one of a plurality of supported HARQ processes.

Figure 9:
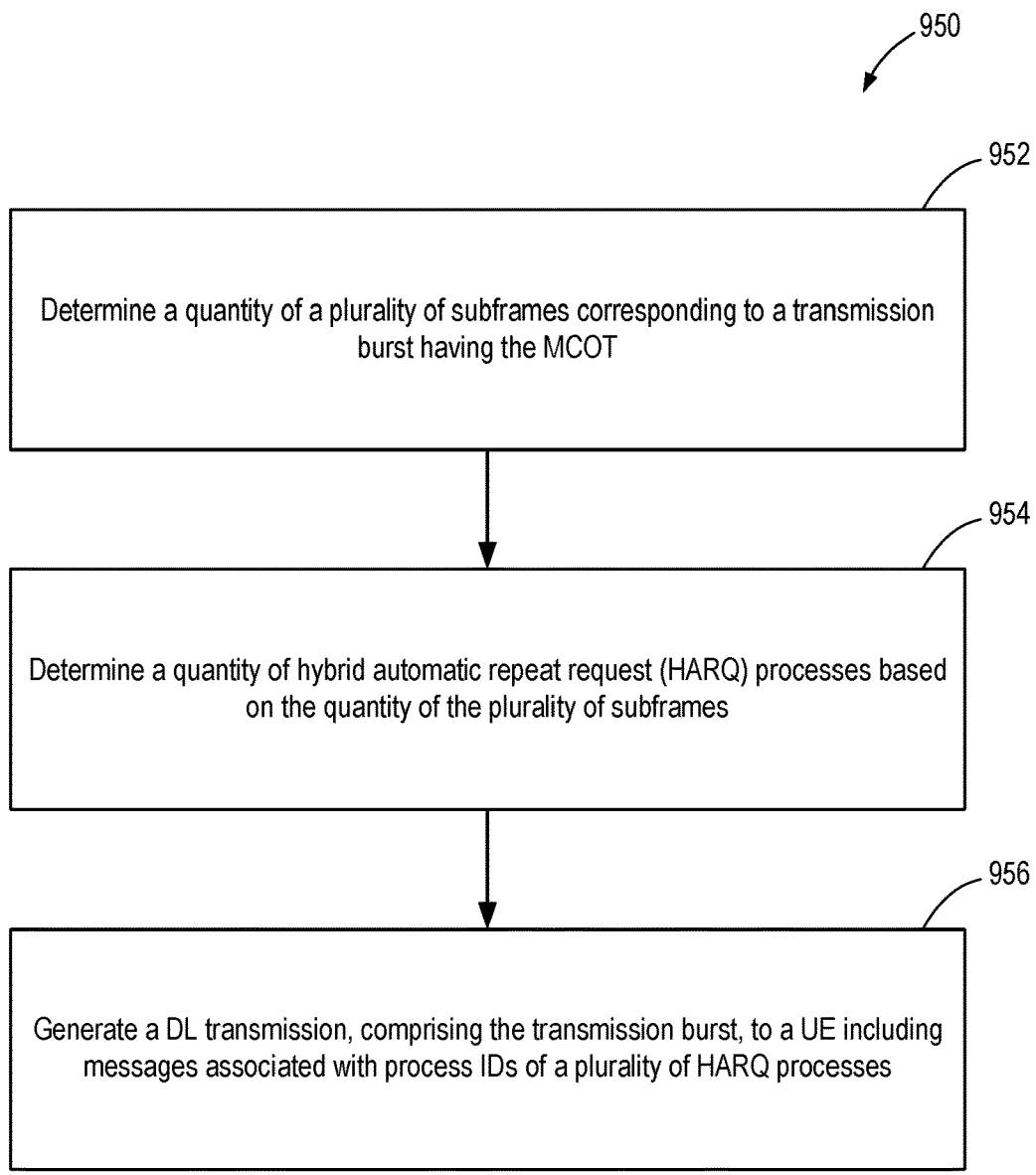
FIG. 9 is a block diagram illustrating a method for generating a DL transmission based on a plurality of HARQ processes according to one embodiment.

FIG. 9 is a block diagram illustrating a method for generating a DL transmission based on a plurality of HARQ processes according to one embodiment. The method 950 includes determining 952 a quantity of a plurality of subframes corresponding to a transmission burst having the MCOT; determining 954 a quantity of HARQ processes based on the quantity of the plurality of subframes, wherein the quantity of HARQ processes corresponds to a plurality of HARQ processes; and generating 956 a DL transmission, comprising the transmission burst, to a UE including messages associated with process IDs of a plurality of HARQ processes.

Determining the quantity of HARQ processes based on the quantity of the plurality of subframes can further include determining the quantity of HARQ processes based on a DL and UL traffic ratio. Determining the quantity of HARQ processes based on the quantity of the plurality of subframes can further include determining the quantity of HARQ processes based on a gap between subsequent transmission bursts.

The method 950 can further include scheduling a UL transmission on a last subframe of the transmission burst. The UL transmission can be an sPUCCH. The sPUCCH can comprise two or four symbols. The UL transmission can comprise a transmission for ACK/NACK. The transmission for ACK/NACK can comprise a plurality of ACK/NACK messages associated with the plurality of HARQ processes.

The transmissions associated with the plurality of HARQ processes can begin on a first subframe of the DL transmission and end four subframes before the last subframe of the DL transmission. The method 950 can also include generating a second DL transmission, comprising a second transmission burst, wherein the DL transmission is a first DL transmission, the second DL transmission is subsequent to the first DL transmission, and the transmission burst is a first transmission burst.

The second transmission burst can comprise messages associated with a second plurality of HARQ processes and a first plurality of HARQ processes, wherein the plurality of HARQ processes comprise the first plurality of HARQ processes. The first transmission for ACK/NACK of the first transmission burst can comprise ACK/NACK messages for a first portion of the first plurality of HARQ processes. A second transmission for ACK/NACK of the second transmission burst can comprise ACK/NACK messages for a second portion of the first plurality of HARQ processes and a portion of the second plurality of HARQ processes.

Figure 10:
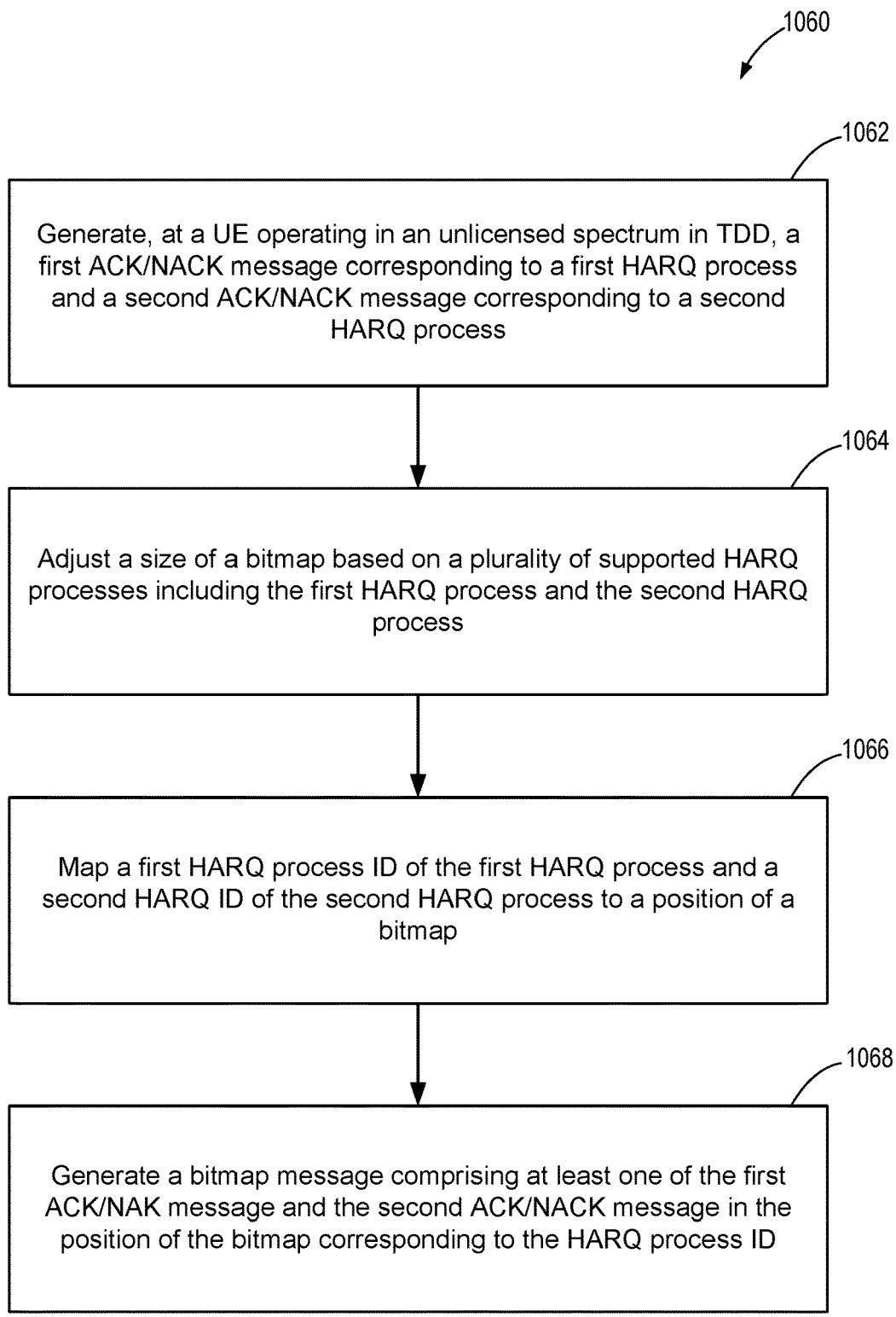
FIG. 10 is a block diagram illustrating a method for generating a bitmap message according to one embodiment.

FIG. 10 is a block diagram illustrating a method for generating a bitmap message according to one embodiment. The method 1060 can include generating 1062, at a UE operating in an unlicensed spectrum in TDD, a first ACK/NACK message corresponding to a first HARQ process and a second ACK/NACK message corresponding to a second HARQ process; adjusting 1064 a size of a bitmap based on a plurality of supported HARQ processes including the first HARQ process and the second HARQ process; mapping 1066 a first HARQ process identifier (ID) of the first HARQ process and a second HARQ ID of the second HARQ process to a same position of a bitmap; and generating 1068 a bitmap message comprising at least one of the first ACK/NACK message and the second ACK/NACK message in the same position of the bitmap corresponding to the HARQ process ID.

The method 1060 can further include generating a bundled ACK/NACK message comprising the at least one of the first ACK/NACK message and the second ACK/NACK message. Generating the bitmap message comprising the at least one of the first ACK/NACK message and the second ACK/NACK message can further include generating the bitmap message comprising the bundled HARQ ACK message representing the first ACK/NACK message and the second ACK/NACK message.

The bundled ACK/NACK message can include an ACK value if the first ACK/NACK message and the second ACK/NACK message include ACK values. The bundled ACK/NACK message can include a NACK value if at least one of the first ACK/NACK message and the second ACK/NACK message include a NACK value. The first process ID and the second process ID can be consecutive process IDs.

Figure 11:
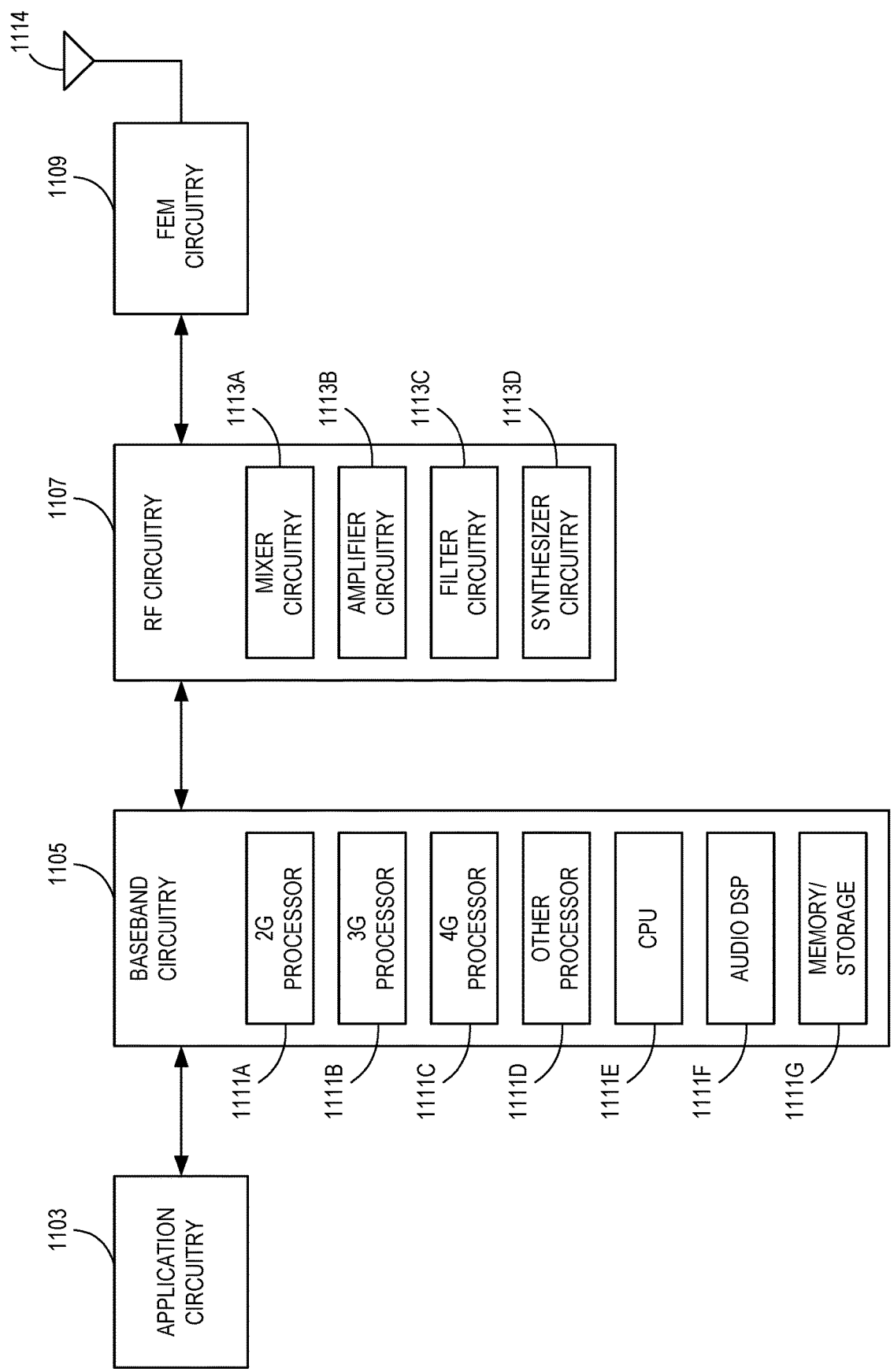
FIG. 11 is a block diagram illustrating components of a device according to one embodiment.

FIG. 11 is a block diagram illustrating components of a device according to one embodiment. In some embodiments, the device may include application circuitry 1103, baseband circuitry 1105, Radio Frequency (RF) circuitry 1107, front-end module (FEM) circuitry 1109, and one or more antennas 1114, coupled together at least as shown in FIG. 11. Any combination or subset of these components can be included, for example, in a UE device or an eNodeB device.

The application circuitry 1103 may include one or more application processors. By way of non-limiting example, the application circuitry 1103 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 1105 may include one or more single-core or multi-core processors. The baseband circuitry 1105 may include one or more baseband processors and/or control logic. The baseband circuitry 1105 may be configured to process baseband signals received from a receive signal path of the RF circuitry 1107. The baseband circuitry 1105 may also be configured to generate baseband signals for a transmit signal path of the RF circuitry 1107. The baseband circuitry 1105 may interface with the application circuitry 1103 for generation and processing of the baseband signals, and for controlling operations of the RF circuitry 1107.

By way of non-limiting example, the baseband circuitry 1105 may include at least one of a second generation (2G) baseband processor 1111A, a third generation (3G) baseband processor 1111B, a fourth generation (4G) baseband processor 1111C, and other baseband processor(s) 1111D for other existing generations and generations in development or to be developed in the future (e.g., fifth generation (5G), sixth generation (6G), etc.). The baseband circuitry 1105 (e.g., at least one of the baseband processors 1111A-1111D) may handle various radio control functions that enable communication with one or more radio networks via the RF circuitry 1107. By way of non-limiting example, the radio control functions may include signal modulation/demodulation, encoding/decoding, radio frequency shifting, other functions, and combinations thereof. In some embodiments, modulation/demodulation circuitry of the baseband circuitry 1105 may be programmed to perform Fast-Fourier Transform (FFT), precoding, and constellation mapping/demapping functions; other functions; and combinations thereof. In some embodiments, encoding/decoding circuitry of the baseband circuitry 1105 may be programmed to perform convolutions; tail-biting convolutions; turbo, Viterbi, and Low Density Parity Check (LDPC) encoder/decoder functions; other functions; and combinations thereof. Embodiments of generating bitmaps and scheduling HARQ processes in TDD are not limited to these examples, and may include other suitable functions.

In some embodiments, the baseband circuitry 1105 may include elements of a protocol stack. By way of non-limiting example, elements of an evolved universal terrestrial radio access network (E-UTRAN) protocol include, for example, physical (PHY), media access control (MAC), radio link control (RLC), packet data convergence protocol (PDCP), and/or radio resource control (RRC) elements. A central processing unit (CPU) 1111E of the baseband circuitry 1105 may be programmed to run elements of the protocol stack for signaling of the PHY, MAC, RLC, PDCP, and/or RRC layers. In some embodiments, the baseband circuitry 1105 may include one or more audio digital signal processor(s) (DSP) 1111F. The audio DSP(s) 1111F may include elements for compression/decompression and echo cancellation. The audio DSP(s) 1111F may also include other suitable processing elements.

The baseband circuitry 1105 may further include a memory/storage 1111G. The memory/storage 1111G may include data and/or instructions for operations performed by the processors of the baseband circuitry 1105 stored thereon. In some embodiments, the memory/storage 1111G may include any combination of suitable volatile memory and/or non-volatile memory. The memory/storage 1111G may also include any combination of various levels of memory/storage including, but not limited to, read-only memory (ROM) having embedded software instructions (e.g., firmware), random access memory (e.g., dynamic random access memory (DRAM)), caches, buffers, etc. In some embodiments, the memory/storage 1111G may be shared among the various processors or dedicated to particular processors.

Components of the baseband circuitry 1105 may be suitably combined in a single chip or a single chipset, or disposed on a same circuit board in some embodiments. In some embodiments, some or all of the constituent components of the baseband circuitry 1105 and the application circuitry 1103 may be implemented together, such as, for example, on a system on a chip (SOC).

In some embodiments, the baseband circuitry 1105 may provide for communication compatible with one or more radio technologies. For example, in some embodiments, the baseband circuitry 1105 may support communication with an evolved universal terrestrial radio access network (E-UTRAN) and/or other wireless metropolitan area networks (WMAN), a wireless local area network (WLAN), or a wireless personal area network (WPAN). Embodiments in which the baseband circuitry 1105 is configured to support radio communications of more than one wireless protocol may be referred to as multi-mode baseband circuitry.

The RF circuitry 1107 may enable communication with wireless networks using modulated electromagnetic radiation through a non-solid medium. In various embodiments, the RF circuitry 1107 may include switches, filters, amplifiers, etc., to facilitate the communication with the wireless network. The RF circuitry 1107 may include a receive signal path, which may include circuitry to down-convert RF signals received from the FEM circuitry 1109, and provide baseband signals to the baseband circuitry 1105. The RF circuitry 1107 may also include a transmit signal path, which may include circuitry to up-convert baseband signals provided by the baseband circuitry 1105, and provide RF output signals to the FEM circuitry 1109 for transmission.

In some embodiments, the RF circuitry 1107 may include a receive signal path and a transmit signal path. The receive signal path of the RF circuitry 1107 may include a mixer circuitry 1113A, an amplifier circuitry 1113B, and a filter circuitry 1113C. The transmit signal path of the RF circuitry 1107 may include the filter circuitry 1113C and the mixer circuitry 1113A. The RF circuitry 1107 may further include a synthesizer circuitry 1113D configured to synthesize a frequency for use by the mixer circuitry 1113A of the receive signal path and the transmit signal path. In some embodiments, the mixer circuitry 1113A of the receive signal path may be configured to down-convert RF signals received from the FEM circuitry 1109 based on the synthesized frequency provided by the synthesizer circuitry 1113D. The amplifier circuitry 1113B may be configured to amplify the down-converted signals.

The filter circuitry 1113C may include a low-pass filter (LPF) or band-pass filter (BPF) configured to remove unwanted signals from the down-converted signals to generate output baseband signals. Output baseband signals may be provided to the baseband circuitry 1105 for further processing. In some embodiments, the output baseband signals may include zero-frequency baseband signals, although this is not a requirement. In some embodiments, the mixer circuitry 1113A of the receive signal path may comprise passive mixers, although the scope of the embodiments is not limited in this respect.

In some embodiments, the mixer circuitry 1113A of the transmit signal path may be configured to up-convert input baseband signals based on the synthesized frequency provided by the synthesizer circuitry 1113D to generate RF output signals for the FEM circuitry 1109. The baseband signals may be provided by the baseband circuitry 1105 and may be filtered by the filter circuitry 1113C. The filter circuitry 1113C may include an LPF, although the scope of the embodiments is not limited in this respect.

In some embodiments, the mixer circuitry 1113A of the receive signal path and the mixer circuitry 1113A of the transmit signal path may include two or more mixers, and may be arranged for quadrature downconversion and/or upconversion, respectively. In some embodiments, the mixer circuitry 1113A of the receive signal path and the mixer circuitry 1113A of the transmit signal path may include two or more mixers and may be arranged for image rejection (e.g., Hartley image rejection). In some embodiments, the mixer circuitry 1113A of the receive signal path and the mixer circuitry 1113A of the transmit signal path may be arranged for direct downconversion and/or direct upconversion, respectively. In some embodiments, the mixer circuitry 1113A of the receive signal path and the mixer circuitry 1113A of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In such embodiments, the RF circuitry 1107 may include analog-to-digital converter (ADC) and digital-to-analog converter (DAC) circuitry, and the baseband circuitry 1105 may include a digital baseband interface to communicate with the RF circuitry 1107.

In some dual-mode embodiments, separate radio interference cancellation (IC) circuitry may be provided for processing signals for each spectrum, although the scope of the embodiments is not limited in this respect.

In some embodiments, the synthesizer circuitry 1113D may include one or more of a fractional-N synthesizer and a fractional N/N+1 synthesizer, although the scope of the embodiments is not limited in this respect, as other types of frequency synthesizers may be suitable. For example, the synthesizer circuitry 1113D may include a delta-sigma synthesizer, a frequency multiplier, a synthesizer comprising a phase-locked loop with a frequency divider, other synthesizers, and combinations thereof.

The synthesizer circuitry 1113D may be configured to synthesize an output frequency for use by the mixer circuitry 1113A of the RF circuitry 1107 based on a frequency input and a divider control input. In some embodiments, the synthesizer circuitry 1113D may be a fractional N/N+1 synthesizer.

In some embodiments, frequency input may be provided by a voltage controlled oscillator (VCO), although that is not a requirement. Divider control input may be provided by either the baseband circuitry 1105 or the application circuitry 1103 depending on the desired output frequency. In some embodiments, a divider control input (e.g., N) may be determined from a look-up table based on a channel indicated by the application circuitry 1103.

The synthesizer circuitry 1113D of the RF circuitry 1107 may include a divider, a delay-locked loop (DLL), a multiplexer, and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements; a phase detector; a charge pump; and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1113D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be an LO frequency (fLO). In some embodiments, the RF circuitry 1107 may include an IQ/polar converter.

The FEM circuitry 1109 may include a receive signal path, which may include circuitry configured to operate on RF signals received from the one or more antennas 1114, amplify the received signals, and provide the amplified versions of the received signals to the RF circuitry 1107 for further processing. The FEM circuitry 1109 may also include a transmit signal path, which may include circuitry configured to amplify signals for transmission provided by the RF circuitry 1107 for transmission by at least one of the one or more antennas 1114.

In some embodiments, the FEM circuitry 1109 may include a TX/RX switch configured to switch between a transmit mode and a receive mode operation. The FEM circuitry 1109 may include a receive signal path and a transmit signal path. The receive signal path of the FEM circuitry 1109 may include a low-noise amplifier (LNA) to amplify received RF signals and provide the amplified received RF signals as an output (e.g., to the RF circuitry 1107). The transmit signal path of the FEM circuitry 1109 may include a power amplifier (PA) configured to amplify input RF signals (e.g., provided by the RF circuitry 1107), and one or more filters configured to generate RF signals for subsequent transmission (e.g., by the one or more antennas 1114).

In some embodiments, the device may include additional elements such as, for example, memory/storage, a display, a camera, one of more sensors, an input/output (I/O) interface, other elements, and combinations thereof. In some embodiments, the device may be configured to perform one or more processes, techniques, and/or methods as described herein, or portions thereof.

Figure 12:
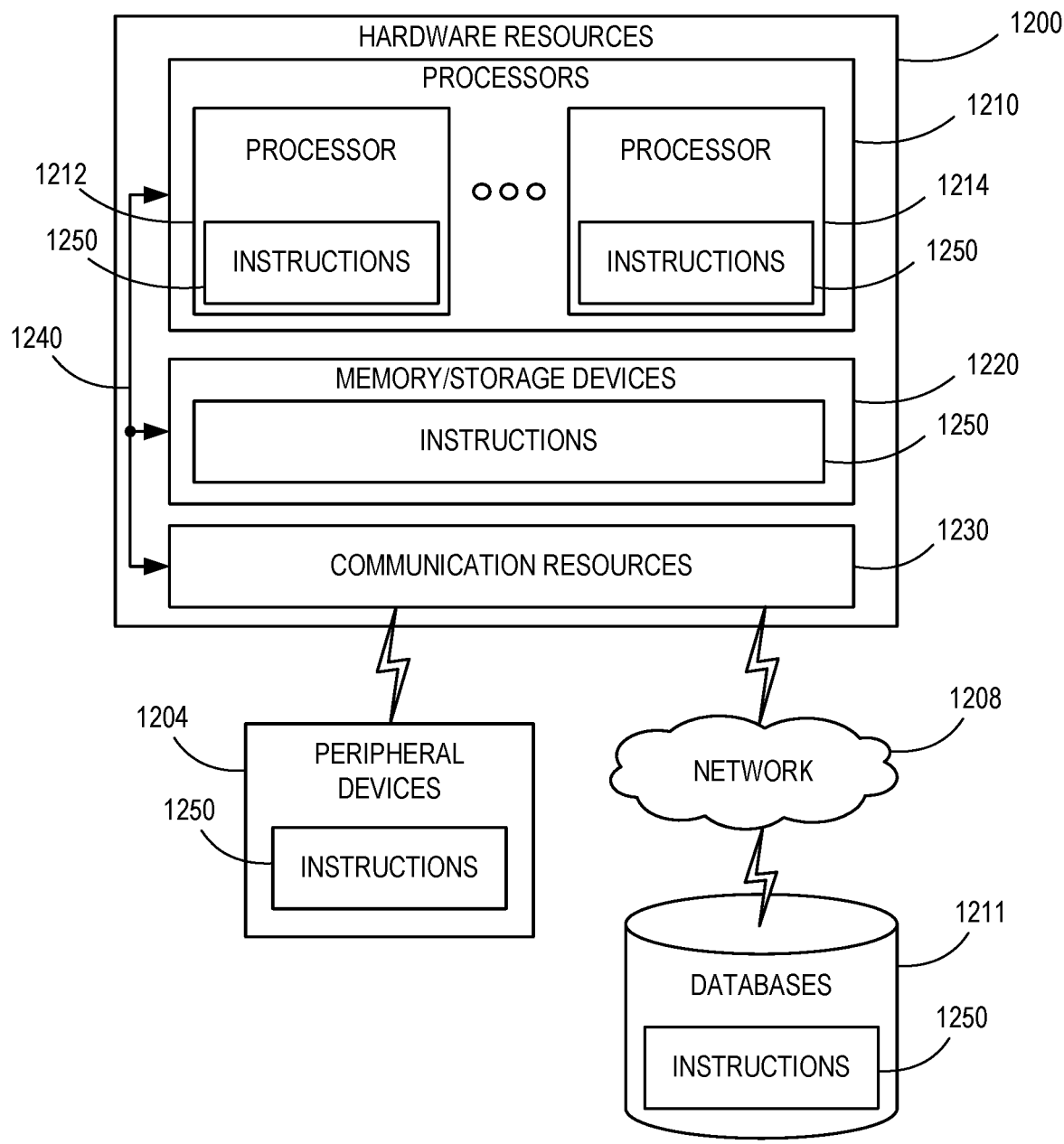
FIG. 12 is a block diagram illustrating components of a device according to some embodiments.

FIG. 12 is a block diagram illustrating components according to some embodiments. Specifically, FIG. 12 shows a diagrammatic representation of hardware resources 1200 including one or more processors (or processor cores) 1210, one or more memory/storage devices 1220, and one or more communication resources 1230, which are communicatively coupled via a bus 1240.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214. The memory/storage devices 1220 may include main memory, disk storage, or any suitable combination thereof.

The communication resources 1230 may include interconnection and/or network interface components or other suitable devices to communicate with one or more peripheral devices 1204 and/or one or more databases 1211 via a network 1208. For example, the communication resources 1230 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1250 may comprise software, a program, an application, an applet, an app, or other executable code for causing at least one of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 and/or the databases 1211. Accordingly, the memory of the processors 1210, the memory/storage devices 1220, the peripheral devices 1204, and the databases 1211 are examples of computer-readable and machine-readable media.

Although certain examples described above are directed to embodiments for LTE-based technology solely operating in unlicensed spectrum without requiring an anchor in licensed spectrum, aspects of the above embodiments can also be applied to the operation of the unlicensed spectrum via licensed-assisted access (LAA) which expands the system bandwidth by utilizing the flexible carrier aggregation (CA) framework introduced by the LTE-Advanced system. Operating in the unlicensed spectrum includes, but is not limited to, the LTE operation in the unlicensed spectrum via dual connectivity which can be referred to a dual connectivity (DC)-based LAA.

Operating in LAA can include utilizing a primary cell (PCell). A PCell includes a cell operating on the primary frequency, in which the UE either performs the initial connection establishment procedure or initiates the connection re-establishment procedure. The PCell can be a cell indicated as the primary cell in the handover procedure. A secondary cell (SCell) can refer to a cell operating on the secondary frequency, which may be configured once an RRC connection is established and which may be used to provide additional radio resources.

The physical uplink control channel (PUCCH) can be supported on the SCell to offload traffic from the PCell, with the number of PUCCH cell groups being no more than two.

Controlling the payload of a physical uplink control channel (PUCCH) for LAA SCells can include implementing a number of guidelines. For example, the PUCCH can carry uplink control information (UCI) including HARQ ACK/NACK feedback, channel state information (CSI) reports, and/or scheduling requests (SR). The HARQ ACK/NACK feedback can have a large payload size due to multiple DL HARQ feedback, MIMO, and/or multiple component carriers (CCs). To control the payload size of the HARQ ACK/NACK feedback, the following limitations can also be implemented.

Spatial bundling can be configured. The HARQ ACK/NACK feedback can be semi-statically configured (e.g., via RRC signaling), or dynamically configured (e.g., via downlink control information (DCI)). Also, bundling across time and/or frequency can be configured as described above. A HARQ ACK/NACK codebook size can be semi-statically configured, based on configured CCs, via higher layer signaling (e.g., RRC signaling). The adaptation of a HARQ ACK codebook can be supported to control the payload size. The HARQ ACK codebook adaptation can depend on the actual scheduled CCs and/or subframes, rather than the configured CCs.

Given that the eNodeB does not know a priori where the PUCCH will be transmitted, additional indications are needed for the timing relationship (e.g., timing relationship between HARQ ACK/NACK feedback carried over the PUCCH and the corresponding physical downlink shared channel (PDSCH) transmission). The association between the HARQ ACK/NACK feedback and the PDSCH transmission can be indicated by the use of bitmap-based feedback. The bitmap-based feedback size can be dependent on the maximum supported DL HARQ processes. Each time the PUCCH is transmitted, the UE can transmit the bitmap-based feedback with the latest feedback. The default value of the HARQ ACK/NACK feedback can be NACK. Providing said feedback may increase the payload size of the PUCCH. The association between HARQ ACK/NACK feedback and PDSCH transmission can also be indicated by predefining a rule to combine the HARQ ACK/NACK feedback. The HARQ ACK/NACK feedback can be concatenated according to an increasing order of cell indexes, and further an increasing order of HARQ process IDs.

Example Embodiments

Example 1 is an apparatus for an evolved node B (eNodeB). The apparatus operates in an unlicensed spectrum in time division duplex (TDD), including electronic memory to store a maximum channel occupancy time (MCOT). The apparatus operates in an unlicensed spectrum in time division duplex (TDD), including one or more baseband processors designed to determine a quantity of a variety of subframes corresponding to a transmission burst having the MCOT, and determine a quantity of hybrid automatic repeat request (HARQ) processes based on the quantity of the variety of subframes, where the quantity of HARQ processes corresponds to a variety of HARQ processes. The apparatus operates in an unlicensed spectrum in time division duplex (TDD), including one or more baseband processors designed to generate a downlink (DL) transmission, including the transmission burst, to a user equipment (UE) including messages associated with the variety of HARQ processes.

Example 2 is the apparatus of Example 1, where the one or more baseband processors designed to determine the quantity of HARQ processes based on the quantity of the variety of subframes are further designed to determine the quantity of HARQ processes based on a DL and uplink (UL) traffic ratio.

Example 3 is the apparatus of Example 1, where the one or more baseband processors designed to determine the quantity of HARQ processes based on the quantity of the variety of subframes are further designed to determine the quantity of HARQ processes based on a gap between subsequent transmission bursts.

Example 4 is the apparatus of Example 1, where the one or more baseband processors are further designed to schedule a UL transmission on a last subframe of the transmission burst.

Example 5 is the apparatus of Example 4, where the UL transmission is a short physical uplink control channel (sPUCCH).

Example 6 is the apparatus of Example 5, where the sPUCCH includes two or four symbols.

Example 7 is the apparatus of Example 4, where the UL transmission includes a transmission for acknowledgement (ACK)/negative acknowledgement (NACK).

Example 8 is the apparatus of Example 7, where the transmission for ACK/NACK includes a variety of ACK/NACK messages associated with the variety of HARQ processes.

Example 9 is the apparatus of Example 1, where transmissions associated with the variety of HARQ processes begin on a first subframe of the DL transmission and end four subframes before the last subframe of the DL transmission.

Example 10 is the apparatus of Example 1, where the one or more baseband processors are further designed to generate a second DL transmission, including a second transmission burst, where: the DL transmission is a first DL transmission, the second DL transmission is subsequent to the first DL transmission, and the transmission burst is a first transmission burst.

Example 11 is the apparatus of Example 10, where the second transmission burst includes messages associated with a second variety of HARQ processes and a first variety of HARQ processes, where the variety of HARQ processes includes the first variety of HARQ processes.

Example 12 is the apparatus of Example 11, where a first transmission for ACK/NACK of the first transmission burst includes ACK/NACK messages for a first portion of the first variety of HARQ processes.

Example 13 is the apparatus of Example 12, where a second transmission for ACK/NACK of the second transmission burst includes ACK/NACK messages for a second portion of the first variety of HARQ processes and a portion of the second variety of HARQ processes.

Example 14 is an apparatus for a user equipment (UE). The apparatus operates in an unlicensed spectrum in time division duplex (TDD), including electronic memory to store an acknowledgement (ACK)/negative acknowledgement (NACK) message, and corresponding to a hybrid automatic repeat request (HARQ) process. The apparatus operates in an unlicensed spectrum in time division duplex (TDD), includes one or more baseband processors designed to access a bitmap including a variety of positions based on a variety of supported HARQ processes including the HARQ process, and map a HARQ process identifier (ID) of the HARQ process to a position from the variety of positions of the bitmap. The apparatus operates in an unlicensed spectrum in time division duplex (TDD), includes one or more baseband processors designed to generate a bitmap message including the ACK/NACK message in the position of the bitmap corresponding to the HARQ process ID.

Example 15 is the apparatus of Example 14, where each of the variety of positions of a bitmap corresponds with at least a different one of a variety of supported HARQ processes.

Example 16 is the apparatus of Example 14, where the ACK/NACK message is a bundled ACK/NACK message that combines two or more ACK/NACK messages.

Example 17 is the apparatus of Example 14, where the one or more baseband processors designed to generate the bitmap message including the ACK/NACK message are further designed to generate the bitmap message including the bundled ACK/NACK message in the position of the bitmap corresponding to two or more HARQ process IDs including the HARQ process ID.

Example 18 is a computer-readable storage medium. The computer-readable storage medium has stored thereon instructions that, when implemented by a computing device, cause the computing device to generate, at a user equipment (UE) operating in an unlicensed spectrum in time division duplex (TDD), a first acknowledgement (ACK)/negative acknowledgement (NACK) message corresponding to a first hybrid automatic repeat request (HARQ) process and a second ACK/NACK message corresponding to a second HARQ process, and adjust a size of a bitmap based on a variety of supported HARQ processes including the first HARQ process and the second HARQ process. The computer-readable storage medium has stored thereon instructions that, when implemented by a computing device, cause the computing device to map a first HARQ process identifier (ID) of the first HARQ process and a second HARQ ID of the second HARQ process to a same position of a bitmap, and generate a bitmap message including at least one of the first ACK/NACK message and the second ACK/NACK message in the same position of the bitmap corresponding to the HARQ process ID.

Example 19 is the computer-readable storage medium of Example 18, where the instructions are further designed to generate a bundled ACK/NACK message including the at least one of the first ACK/NACK message and the second ACK/NACK message.

Example 20 is the computer-readable storage medium of Example 19, where the instructions designed to generate the bitmap message including the at least one of the first ACK/NACK message and the second ACK/NACK message are further designed to generate the bitmap message including the bundled HARQ ACK message representing the first ACK/NACK message and the second ACK/NACK message.

Example 21 is the computer-readable storage medium of Example 19, where the bundled ACK/NACK message includes an ACK value if the first ACK/NACK message and the second ACK/NACK message include ACK values.

Example 22 is the computer-readable storage medium of Example 19, where the bundled ACK/NACK message includes a NACK value if at least one of the first ACK/NACK message and the second ACK/NACK message include a NACK value.

Example 23 is the computer-readable storage medium of Example 19, where the first process ID and the second process ID are consecutive process IDs.

Example 24 is a method for an evolved node B (eNodeB). The method operates in an unlicensed spectrum in time division duplex (TDD), including determining a quantity of a variety of subframes corresponding to a transmission burst having a maximum channel occupancy time (MCOT), and determining a quantity of hybrid automatic repeat request (HARQ) processes based on the quantity of the variety of subframes, where the quantity of HARQ processes corresponds to a variety of HARQ processes. The method operates in an unlicensed spectrum in time division duplex (TDD), including generating a downlink (DL) transmission, including the transmission burst, to a user equipment (UE) including messages associated with the variety of HARQ processes.

Example 25 is the method of Example 24, where determining the quantity of HARQ processes based on the quantity of the variety of subframes further includes determining the quantity of HARQ processes based on a DL and uplink (UL) traffic ratio.

Example 26 is the method of Example 24, where determining the quantity of HARQ processes based on the quantity of the variety of subframes further includes determining the quantity of HARQ processes based on a gap between subsequent transmission bursts.

Example 27 is the method of Example 24, further includes scheduling a UL transmission on a last subframe of the transmission burst.

Example 28 is the method of Example 27, where the UL transmission is a short physical uplink control channel (sPUCCH).

Example 29 is the method of Example 28, where the sPUCCH includes two or four symbols.

Example 30 is the method of Example 27, where the UL transmission includes a transmission for acknowledgement (ACK)/negative acknowledgement (NACK).

Example 31 is the method of Example 30, where the transmission for ACK/NACK includes a variety of ACK/NACK messages associated with the variety of HARQ processes.

Example 32 is the method of Example 24, where transmissions associated with the variety of HARQ processes begin on a first subframe of the DL transmission and end four subframes before the last subframe of the DL transmission.

Example 33 is the method of Example 24, further including generateing a second DL transmission, including a second transmission burst, where: the DL transmission is a first DL transmission, the second DL transmission is subsequent to the first DL transmission, and the transmission burst is a first transmission burst.

Example 34 is the method of Example 33, where the second transmission burst includes messages associated with a second variety of HARQ processes and a first variety of HARQ processes, where the variety of HARQ processes includes the first variety of HARQ processes.

Example 35 is the method of Example 34, where a first transmission for ACK/NACK of the first transmission burst includes ACK/NACK messages for a first portion of the first variety of HARQ processes.

Example 36 is the method of Example 35, where a second transmission for ACK/NACK of the second transmission burst includes ACK/NACK messages for a second portion of the first variety of HARQ processes and a portion of the second variety of HARQ processes.

Example 37 is a method for a user equipment (UE). The method operates in an unlicensed spectrum in time division duplex (TDD), including accessing a bitmap including a variety of positions based on a variety of supported hybrid automatic repeat request (HARQ) processes including an HARQ process, and mapping a HARQ process identifier (ID) of the HARQ process to a position from the variety of positions of the bitmap. The method operates in an unlicensed spectrum in time division duplex (TDD), including generating a bitmap message including an acknowledgement (ACK)/negative acknowledgement (NACK) message in the position of the bitmap corresponding to the HARQ process ID.

Example 38 is the method of Example 37, where each of the variety of positions of a bitmap corresponds with at least a different one of a variety of supported HARQ processes.

Example 39 is the method of Example 37, where the ACK/NACK message is a bundled ACK/NACK message that combines two or more ACK/NACK messages.

Example 40 is the method of Example 37, where generating the bitmap message including the ACK/NACK message further includes generating the bitmap message including the bundled ACK/NACK message in the position of the bitmap corresponding to two or more HARQ process IDs including the HARQ process ID.

Example 41 is a method. The method includes generating, at a user equipment (UE) operating in an unlicensed spectrum in time division duplex (TDD), a first acknowledgement (ACK)/negative acknowledgement (NACK) message corresponding to a first hybrid automatic repeat request (HARQ) process and a second ACK/NACK message corresponding to a second HARQ process, and adjusting a size of a bitmap based on a variety of supported HARQ processes including the first HARQ process and the second HARQ process. The method includes mapping a first HARQ process identifier (ID) of the first HARQ process and a second HARQ ID of the second HARQ process to a same position of a bitmap, and generating a bitmap message including at least one of the first ACK/NACK message and the second ACK/NACK message in the same position of the bitmap corresponding to the HARQ process ID.

Example 42 is the method of Example 41, further including generating a bundled ACK/NACK message including the at least one of the first ACK/NACK message and the second ACK/NACK message.

Example 43 is the method of Example 41, where generating the bitmap message including the at least one of the first ACK/NACK message and the second ACK/NACK message further includes generating the bitmap message including the bundled HARQ ACK message representing the first ACK/NACK message and the second ACK/NACK message.

Example 44 is the method of Example 41, where the bundled ACK/NACK message includes an ACK value if the first ACK/NACK message and the second ACK/NACK message include ACK values.

Example 45 is the method of Example 41, where the bundled ACK/NACK message includes a NACK value if at least one of the first ACK/NACK message and the second ACK/NACK message include a NACK value.

Example 46 is the method of Example 41, where the first process ID and the second process ID are consecutive process IDs.

Example 47 is at least one computer-readable storage medium having stored thereon computer-readable instructions, when executed, to implement a method as exemplified in any of Examples 24-46.

Example 48 is an apparatus including a manner to perform a method as exemplified in any of Examples 24-46.

Example 49 is a manner for performing a method as exemplified in any of Examples 24-46.

Various techniques, or certain aspects or portions thereof, may take the form of program code (i.e., instructions) embodied in tangible media, such as floppy diskettes, CD-ROMs, hard drives, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNodeB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment. Thus, appearances of the phrase "an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations of embodiments.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the embodiments are not to be limited to the details given herein, but may be modified within the scope and equivalents of the appended claims.

The invention claimed is:

1. A base station operating in an unlicensed spectrum in time division duplex (TDD), comprising:
   electronic memory to store a maximum channel occupancy time (MCOT); and
   one or more baseband processors configured to:
      determine a quantity of subframes used in transmission bursts having the MCOT;
      determine a maximum supported quantity of hybrid automatic repeat request (HARQ) processes based on the quantity of the subframes in the transmission bursts having the MCOT;
      indicate, to a user equipment (UE), the maximum supported quantity of HARQ processes; and
      generate a first transmission burst of the transmission bursts having the MCOT, wherein the first transmission burst includes first messages each associated with one of a first plurality of HARQ processes and second messages each associated with one of a second plurality of HARQ processes, wherein a number of the first plurality of HARQ processes plus a number of the second plurality of HARQ processes is less than or equal to than the maximum supported quantity of HARQ processes.

2. The base station of claim 1, wherein the one or more baseband processors is further configured to determine the maximum supported quantity of HARQ processes based on a DL and uplink (UL) traffic ratio.

3. The base station of claim 1, wherein the one or more baseband processors is further configured to determine the maximum supported quantity of HARQ processes based on a gap between the transmission bursts having the MCOT.

4. The base station of claim 1, wherein the one or more baseband processors are further configured to schedule a UL transmission on a last subframe of the first transmission burst.

5. The base station of claim 4, wherein the UL transmission is a short physical uplink control channel (sPUCCH).

6. The base station of claim 5, wherein the sPUCCH comprises two or four symbols.

7. The base station of claim 4, wherein the UL transmission comprises a transmission for acknowledgement (ACK)/negative acknowledgement (NACK) messages for the first plurality of HARQ processes.

8. The base station of claim 4, wherein the transmission for ACK/NACK messages for the first plurality of HARQ processes comprises a bitmap.

9. The base station of claim 1, wherein transmissions associated with the first plurality of HARQ processes begin on a first subframe of the first transmission burst and end before a last subframe of the first transmission burst.

10. The base station of claim 1, wherein the one or more baseband processors are further configured to generate a second transmission burst of the transmission bursts having the MCOT, wherein the second transmission burst comprises messages associated with the second plurality of HARQ processes and messages associated with a third plurality of HARQ processes, wherein the number of the first plurality of HARQ processes plus the number of the second plurality of HARQ processes plus a number of the third plurality of HARQ processes is less than or equal to than the maximum supported quantity of HARQ processes.

11. The base station of claim 10, wherein a UL transmission of the first transmission burst comprises ACK/NACK messages for the first plurality of HARQ processes.

12. The base station of claim 11, wherein a UL transmission of the second transmission burst comprises ACK/NACK messages for the second plurality of HARQ processes.

13. The base station of claim 10, wherein the second transmission burst further comprises one of the first messages of the first transmission burst.

14. The base station of claim 13, wherein a UL transmission on the second transmission burst comprises an ACK/NACK message for the HARQ process of the first plurality of HARQ processes that corresponds to the one of the first messages of the first transmission burst.

* * * * *